United States Patent
Jin et al.

(10) Patent No.: US 10,499,443 B2
(45) Date of Patent: Dec. 3, 2019

(54) DATA TRANSMISSION METHOD, RELATED DEVICE, AND SYSTEM

(71) Applicant: Huawei Technologies Co., Ltd., Shenzhen (CN)

(72) Inventors: Hui Jin, Beijing (CN); Guowei Ouyang, Beijing (CN); Xiaoyan Duan, Beijing (CN); Qiang Yi, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 32 days.

(21) Appl. No.: 15/749,382

(22) PCT Filed: Jul. 31, 2015

(86) PCT No.: PCT/CN2015/085743
§ 371 (c)(1),
(2) Date: Jan. 31, 2018

(87) PCT Pub. No.: WO2017/020176
PCT Pub. Date: Feb. 9, 2017

(65) Prior Publication Data
US 2018/0227970 A1    Aug. 9, 2018

(51) Int. Cl.
*H04W 16/18* (2009.01)
*H04W 88/04* (2009.01)
*H04W 76/14* (2018.01)
*H04W 76/10* (2018.01)
*H04W 36/18* (2009.01)
(Continued)

(52) U.S. Cl.
CPC ....... *H04W 76/14* (2018.02); *H04W 28/0268* (2013.01); *H04W 36/18* (2013.01); *H04W 48/14* (2013.01); *H04W 76/10* (2018.02); *H04W 76/23* (2018.02); *H04W 8/26* (2013.01); *H04W 72/0453* (2013.01); *H04W 88/04* (2013.01)

(58) Field of Classification Search
None
See application file for complete search history.

(56) References Cited

U.S. PATENT DOCUMENTS 9,655,165 B2 * 5/2017 Cho ............... H04W 72/042
2010/0049843 A1 * 2/2010 Xiong ............... H04L 29/12311
709/223

(Continued)

FOREIGN PATENT DOCUMENTS

CN    101646270 A    2/2010
CN    103518419 A    1/2014

(Continued)

OTHER PUBLICATIONS

XP050942707, S2-150822, Huawei, "Service continuity for Prose", SA WG2 Meeting #108, Apr. 13-17, 2015, 5 pages, San Jose Del Cabo, Mexico.

(Continued)

*Primary Examiner* — Ajit Patel
(74) *Attorney, Agent, or Firm* — Slater Matsil, LLP

(57) ABSTRACT

Embodiments provide a data transmission method. The method includes: receiving, by a core network entity, a first message sent by a first user equipment (UE); and setting up, by the core network entity, a target bearer on the first UE according to the first message, so that a second UE transmits data using the target bearer.

20 Claims, 9 Drawing Sheets

(51) Int. Cl.
*H04W 76/23* (2018.01)
*H04W 28/02* (2009.01)
*H04W 48/14* (2009.01)
*H04W 8/26* (2009.01)
*H04W 72/04* (2009.01)

(56) References Cited

U.S. PATENT DOCUMENTS

| | | | |
|---|---|---|---|
| 2012/0155391 A1* | 6/2012 | Kim | H04W 4/70 370/328 |
| 2013/0287012 A1* | 10/2013 | Pragada | H04W 76/25 370/338 |
| 2014/0036873 A1* | 2/2014 | Cheng | H04W 36/0022 370/331 |
| 2014/0128068 A1 | 5/2014 | Klein et al. | |
| 2015/0117425 A1* | 4/2015 | Gupta | H04W 76/18 370/338 |
| 2015/0156693 A1* | 6/2015 | Tabet | H04W 36/30 455/437 |
| 2015/0237555 A1* | 8/2015 | Kashiwase | H04W 36/14 370/329 |
| 2016/0037340 A1* | 2/2016 | Rayment | H04L 63/0853 370/338 |
| 2016/0105923 A1 | 4/2016 | Chen et al. | |
| 2017/0105227 A1* | 4/2017 | Pinheiro | H04W 28/0263 |
| 2017/0311309 A1* | 10/2017 | Fujishiro | H04W 72/048 |
| 2018/0035353 A1* | 2/2018 | Lee | H04W 76/10 |

FOREIGN PATENT DOCUMENTS

| | | |
|---|---|---|
| CN | 104581902 A | 4/2015 |
| CN | 104660545 A | 5/2015 |
| CN | 104812092 A | 7/2015 |
| WO | 2014190534 A1 | 4/2014 |
| WO | 2015031170 A2 | 3/2015 |

OTHER PUBLICATIONS

XP050977054, S2-15xxxx, Huawei, Hisilicon, Ericsson, "Service Continuity for ProSe", SA WG2 Meeting #109, May 25-29, 2015, 5 pages, Fukuoka, Japan.

XP050961415, S2-150280, Huawei, HiSilicon, "Considerations on ProSe Direct Communication packet filter", SA WG2 Meeting #107, Jan. 26-30, 2015, 3 pages, Sorrento, Italy.

3GPP TSG RAN WG2 #89bis, XP050936143, R2-151169, ZTE, "Considerations on the UE-to-Network Relays", Apr. 20-24, 2015, 7 pages, Bratislava, Slovakia.

3GPP TS 23.401 V13.3.0, 3rd Generation Partnership Project; Technical Specification Group Services and System Aspects; General Packet Radio Service (GPRS) enhancements for Evolved Universal Terrestrial Radio Access Network (E-UTRAN) access (Release 13), Jun. 2015, 324 pages.

* cited by examiner

DATA TRANSMISSION METHOD, RELATED DEVICE, AND SYSTEM

CROSS-REFERENCE TO RELATED APPLICATIONS

This application is a National Stage of International Application No. PCT/CN2015/085743, filed on Jul. 31, 2015, which is hereby incorporated by reference in its entirety.

TECHNICAL FIELD

The present invention relates to the communications field, and specifically, to a data transmission method, a related device, and a system.

BACKGROUND

With rapid development of technologies, wearable devices appear in people's life. Directly connecting a wearable device to a network will be a development tendency in future. However, because a wearable device has a small battery capacity, when the wearable device directly performs network communication with a base station, rapid battery consumption and a short standby time are caused. In addition, the wearable device has a special shape, resulting in difficult antenna design. At present, only single-antenna design can be implemented, and only a same data quantity can be sent. Compared with multiple antennas design, more time needs to be spent, and lots of network resources need to be consumed.

Usually, there is a high-performance mobile terminal around a wearable device. The mobile terminal and the wearable device separately perform network communication, and there is no cooperation. Therefore, by connecting the wearable device to a network by using the mobile terminal, a quantity of electricity of the wearable device can be saved, and transmission efficiency of the wearable device can be improved. For example, at present, user equipment (UE), as an Internet Protocol (IP) layer router, assigns an IP address to another device, so that the another device can access a network using the UE.

However, when a wearable device changes between two working modes: accessing a network by itself and accessing a network by using UE, continuity of an IP address cannot be ensured, resulting in communication interruption. For example, if the wearable device is performing voice communication, voice communication interruption may be caused. In addition, after the wearable device accesses the network by using the UE, quality of service (QoS) of a service cannot be ensured.

SUMMARY

Embodiments of the present invention provide a data transmission method, a related device, and a system, so as to ensure continuity of an IP address and QoS of a related service when a wearable device changes between different working modes.

A first aspect of the present invention provides a data transmission method. The method includes receiving, by a core network entity, a first message sent by first user equipment UE. The method also includes setting up, by the core network entity, a target bearer on the first UE according to the first message, so that second UE transmits data by using the target bearer.

Optionally, the setting up, by the core network entity, a target bearer on the first UE according to the first message includes: obtaining, by the core network entity, first bearer context, where the first bearer context is bearer context corresponding to a second evolved packet system bearer identity EBI of the second UE; and setting up, by the core network entity, the target bearer on the first UE according to the first bearer context.

Optionally, the setting up, by the core network entity, a target bearer on the first UE according to the first message includes: obtaining, by the core network entity, first bearer context, where the first bearer context is bearer context corresponding to a second EBI of the second UE; obtaining, by the core network entity, first quality of service QoS from the first bearer context; when the core network entity determines that no bearer satisfying the first QoS exists on the first UE, sending, by the core network entity, a second message to a second gateway by using a first gateway, so that the second gateway sends a third message to the core network entity by using the first gateway; and setting up, by the core network entity according to the third message, the target bearer satisfying the first QoS on the first UE.

Optionally, the second message includes a linked evolved packet system bearer identity LBI, where a value of the LBI is 0; and the third message includes a traffic flow template TFT, where a value of the TFT is null.

Optionally, the obtaining, by the core network entity, first bearer context includes: the first message includes an identity of the second UE; and obtaining, by the core network entity by using the identity of the second UE, context of the second UE from locally saved second bearer context of the second UE, and obtaining the first bearer context from the context of the second UE; or obtaining, by the core network entity by using the identity of the second UE, another core network entity currently saving the second UE other than the core network entity, obtaining context of the second UE from the another core network entity, and obtaining the first bearer context from the context of the second UE.

Optionally, the obtaining, by the core network entity, first bearer context includes: selecting, by the core network entity for the second UE, a first gateway and a second gateway that are the same as a first gateway and a second gateway of the first UE; sending, by the core network entity, a fourth message to the second gateway by using the first gateway, so that the second gateway sends a fifth message to the core network entity by using the first gateway; and obtaining, by the core network entity, the first bearer context from the fifth message.

Optionally, after the receiving, by a core network entity, a first message sent by first user equipment UE, the method further includes: allocating, by the core network entity, a first EBI, where the first EBI is an EBI corresponding to the target bearer; and saving, by the core network entity, a mapping relationship between the first EBI and the second EBI.

Optionally, after the receiving, by a core network entity, a first message sent by first user equipment UE, the method further includes: allocating, by the core network entity, a device to device bearer identity DBI.

Optionally, the method further includes: sending, by the core network entity, the first EBI and the DBI to the first UE by using a base station serving the first UE, so that the first UE saves a mapping relationship between the first EBI and the DBI; or sending, by the core network entity, an Internet Protocol IP address of the second UE, the first EBI, and the DBI to the first UE by using a base station serving the first UE, so that the first UE saves a mapping relationship between the IP address of the second UE and the first EBI, and the DBI.

Optionally, the method further includes: sending, by the core network entity, the identity of the second UE to the first UE by using the base station serving the first UE, so that the first UE learns that the target bearer is set up for the second UE.

Optionally, the method further includes: sending, by the core network entity, a TFT to the first UE by using the base station serving the first UE, where a value of the TFT is null; and/or sending, by the core network entity, an LBI to the first UE by using the base station serving the first UE, where a value of the LBI is 0.

Optionally, after the setting up, by the core network entity, a target bearer on the first UE, the method further includes: sending, by the core network entity, the second EBI and the DBI to the second UE by using the first UE, so that the second UE saves a mapping relationship between the second EBI and the DBI.

Optionally, the setting up, by the core network entity, a target bearer on the first UE according to the first message includes: sending, by the core network entity to a base station serving the first UE, a tunnel endpoint identifier TEID that is of the first gateway and that corresponds to the second EBI, and the first EBI; and sending, by the core network entity to the first gateway, a TEID that is of the base station and that corresponds to the first EBI, and the second EBI, so that the first gateway establishes a tunnel connection to the base station.

Optionally, the setting up, by the core network entity, a target bearer on the first UE according to the first message includes: sending, by the core network entity, a sixth message to the second gateway by using the first gateway, so that the second gateway modifies a current mapping target of a TFT of the second UE from a bearer corresponding to the second EBI to the target bearer, where the current target of the TFT of the second UE is the bearer corresponding to the second EBI, and the target bearer has same QoS as the bearer corresponding to the second EBI.

Optionally, the sixth message includes an identity of the second UE and the second EBI.

Optionally, the first message includes a non-access stratum NAS message of the second UE; Or the first message includes a NAS message of the second UE and the identity of the second UE.

Optionally, the NAS message is generated by the second UE, the second UE sends the NAS message to the first UE by using an interface between the second UE and the first UE, and the first UE sends the NAS message to the core network entity by using the first message.

Optionally, the method further includes: receiving, by the core network entity, a seventh message sent by the first UE, where the seventh message includes the NAS message of the second UE, where the NAS message of the second UE is used to request to modify the bearer corresponding to the second EBI of the second UE; when the core network entity learns that QoS of the bearer corresponding to the second EBI needs to be modified to second QoS, obtaining through mapping, by the core network entity, the first EBI according to the mapping relationship between the second EBI and the first EBI; and modifying, by the core network entity, a bearer corresponding to the first EBI on the first UE, so that the bearer corresponding to the first EBI satisfies the second QoS.

Optionally, the method further includes: receiving, by the core network entity, a seventh message sent by the first UE, where the seventh message includes the NAS message of the second UE, where the NAS message of the second UE is used to request to modify the bearer corresponding to the second EBI of the second UE; and when the core network entity learns that QoS of the bearer corresponding to the second EBI needs to be modified to second QoS and the core network entity determines that there is no bearer satisfying the second QoS on the first UE currently, setting up, by the core network entity, a bearer satisfying the second QoS on the first UE.

Optionally, the NAS message includes: a NAS TAU message; or a NAS attach message; or a NAS request bearer resource modification message.

Optionally, the target bearer is a bearer between the first UE and the first gateway; or the target bearer is a bearer between the first UE and the second gateway.

A second aspect of the present invention provides a data transmission method. The method includes sending, by first user equipment (UE), a first message to a core network entity, so that the core network entity sets up a target bearer on the first UE according to the first message, and second UE transmits data by using the target bearer.

Optionally, after the sending, by first user equipment (UE), a first message to a core network entity, the method further includes: obtaining, by the first UE, a first evolved packet system bearer identity EBI, where the first EBI is an EBI corresponding to the target bearer; allocating, by the first UE, a device to device bearer identity DBI; and saving, by the first UE, a mapping relationship between the first EBI and the DBI; or obtaining, by the first UE, an Internet Protocol IP address of the second UE, and saving, by the first UE, a mapping relationship between the IP address of the second UE and the first EBI, and the DBI.

Optionally, after the allocating, by the first UE, a device to device bearer identity DBI, the method further includes: sending, by the first UE, the DBI and QoS of the target bearer to the second UE, so that the second UE learns that QoS of a bearer corresponding to a second EBI on the second UE is the same as the QoS of the target bearer, and saves a mapping relationship between the second EBI and the DBI.

Optionally, after the sending, by first user equipment UE, a first message to a core network entity, the method further includes: receiving, by the first UE, a first EBI corresponding to the target bearer and a DBI that are sent by the core network entity by using a base station serving the first UE; and saving, by the first UE, a mapping relationship between the first EBI and the DBI; or receiving, by the first UE, an IP address of the second UE, the first EBI, and a DBI that are sent by the core network entity by using a base station serving the first UE; and saving, by the first UE, a mapping relationship between the IP address of the second UE and the first EBI, and the DBI.

Optionally, the method further includes: receiving, by the first UE, an identity of the second UE that is sent by the core network entity by using the base station serving the first UE; and learning, by the first UE according to the identity of the second UE, that the target bearer is set up by the core network entity for the second UE.

Optionally, the method further includes: receiving, by the first UE, a TFT that is sent by the core network entity by using the base station serving the first UE, where a value of the TFT is null; and/or receiving, by the first UE, an LBI that is sent by the core network entity by using the base station serving the first UE, where a value of the LBI is 0.

Optionally, the sending, by first user equipment UE, a first message to a core network entity includes: receiving, by the first UE, a sixth message sent by the second UE, where the sixth message includes a non-access stratum NAS message sent by the second UE to the core network entity; and obtaining, by the first UE, the NAS message, and sending the NAS message to the core network entity by using the first message.

Optionally, the obtaining, by the first UE, the NAS message includes: the sixth message includes indication information indicating that the sixth message includes the NAS message; and learning, by the first UE according to the indication information, that the sixth message includes the NAS message, and obtaining the NAS message from the sixth message.

Optionally, the first message includes the NAS message of the second UE; or the first message includes the NAS message of the second UE and the identity of the second UE.

Optionally, after the sending, by first user equipment UE, a first message to a core network entity, the method includes: sending, by the first UE, a seventh message to the core network entity, where the seventh message includes the NAS message of the second UE, where the NAS message of the second UE is used to request to modify the bearer corresponding to the second EBI of the second UE.

Optionally, after the sending, by first user equipment UE, a first message to a core network entity, the method includes: receiving, by the first UE, an eighth message sent by the core network entity, and learning that the eighth message includes the NAS message sent to the first UE; and obtaining, by the first UE, the NAS message, and sending the NAS message to the second UE.

Optionally, the first message includes indication information indicating that the first message includes another NAS message; and the eighth message includes indication information indicating that the eighth message includes another NAS message.

Optionally, the sending the NAS message to the second UE includes: sending, by the first UE, a ninth message to the second UE, where the ninth message includes indication information indicating that the ninth message includes the NAS message.

Optionally, the method further includes: receiving, by the first UE, data that is sent by the second UE by using a bearer corresponding to the DBI, and sending, by the first UE according to the mapping relationship between the DBI and the first EBI, the data to a network by using the target bearer corresponding to the first EBI; or receiving, by the first UE, data that is sent by the second UE by using a bearer corresponding to the DBI, and sending, by the first UE according to the mapping relationship between the IP address of the second UE and the first EBI, and the DBI, the data to a network by using the target bearer corresponding to the first EBI.

Optionally, the method further includes: receiving, by the first UE, data that is sent by the network by using the target bearer corresponding to the first EBI, and sending, by the first UE according to the mapping relationship between the first EBI and the DBI, the data to the second UE by using the bearer corresponding to the DBI; or receiving, by the first UE, data that is sent by the network by using the target bearer corresponding to the first EBI, and sending, by the first UE according to a mapping relationship between the first EBI and a destination IP address of the data, and DBI, the data to the second UE by using the bearer corresponding to the DBI.

Optionally, the NAS message includes: a NAS TAU message; or a NAS attach message; or a NAS request bearer resource modification message.

A third aspect of the present invention provides a data transmission method. The method includes sending, by second user equipment (UE), a first message to a core network entity using first UE, so that the core network entity sets up a target bearer on the first UE according to the first message. The method also includes transmitting, by the second UE, data by using the target bearer.

Optionally, the sending, by second user equipment UE, a first message to a core network entity by using first UE includes: generating, by the second UE, a NAS message sent to the core network entity, and sending the NAS message to the first UE by using a sixth message, so that the first UE obtains the NAS message from the sixth message, and sends the NAS message to the core network entity by using the first message.

Optionally, the sending the NAS message to the first UE by using a sixth message, so that the first UE obtains the NAS message from the sixth message includes: learning, by the first UE according to indication information, that the sixth message includes the NAS message, and obtaining the NAS message from the sixth message, where the sixth message includes the indication information indicating that the sixth message includes the NAS message.

Optionally, after the sending, by second user equipment UE, a first message to a core network entity by using first UE, the method includes: receiving, by the second UE, an eighth message sent by the first UE, where the eighth message includes indication information indicating that the eighth message includes the NAS message; and learning, by the second UE according to the indication information, that the eighth message includes the NAS message, and obtaining the NAS message.

Optionally, after the sending, by second user equipment UE, a first message to a core network entity by using first UE, the method includes: receiving, by the first UE, a second EBI and a DBI that are sent by the first UE; and saving, by the second UE, a mapping relationship between the second EBI and the DBI.

Optionally, after the sending, by second user equipment UE, a first message to a core network entity by using first UE, the method includes: receiving, by the second UE, a ninth message sent by the first UE, where the ninth message includes a DBI and QoS, learning, by the second UE, that QoS of a bearer corresponding to a second EBI is the same as the QoS included in the ninth message, and saving, by the second UE, a mapping relationship between the second EBI and the DBI.

Optionally, the transmitting, by the second UE, data by using the target bearer includes: when the second UE determines, according to a TFT, that the data needs to be sent by using the bearer corresponding to the second EBI, sending, by the second UE, the data to the first UE by using a bearer corresponding to the DBI.

A fourth aspect of the present invention provides a core network entity. The core network entity includes a receiving module, configured to receive a first message sent by first user equipment UE. The core network entity also includes a setup module, configured to set up a target bearer on the first UE according to the first message, so that second UE transmits data by using the target bearer.

Optionally, the setup module includes: an obtaining unit, configured to obtain first bearer context, where the first bearer context is bearer context corresponding to a second evolved packet system bearer identity EBI of the second UE; and a setup unit, configured to set up the target bearer on the first UE according to the first bearer context.

Optionally, the setup module includes: an obtaining unit, configured to obtain first bearer context, where the first bearer context is bearer context corresponding to a second EBI of the second UE, where the obtaining unit is further configured to obtain first quality of service QoS from the first bearer context; a sending unit, configured to: when it is determined that no bearer satisfying the first QoS exists on the first UE, send a second message to a second gateway by using a first gateway, so that the second gateway sends a third message to the core network entity by using the first gateway; and a setup unit, configured to set up, according to the third message, the target bearer satisfying the first QoS on the first UE.

Optionally, the second message includes a linked evolved packet system bearer identity LBI, where a value of the LBI is 0; and the third message includes a traffic flow template TFT, where a value of the TFT is null.

Optionally, the obtaining unit is specifically configured to: obtain, by using an identity of the second UE, context of the second UE from locally saved second bearer context of the second UE, and obtain the first bearer context from the context of the second UE, where the first message includes the identity of the second UE; or the obtaining unit is specifically configured to: obtain, by using an identity of the second UE, another core network entity currently saving the second UE other than the core network entity, obtain context of the second UE from the another core network entity, and obtain the first bearer context from the context of the second UE.

Optionally, the obtaining unit is specifically configured to: select, for the second UE, a first gateway and a second gateway that are the same as a first gateway and a second gateway of the first UE; send a fourth message to the second gateway by using the first gateway, so that the second gateway sends a fifth message to the core network entity by using the first gateway; and obtain the first bearer context from the fifth message.

Optionally, the core network entity further includes: an allocation module, configured to allocate a first EBI, where the first EBI is an EBI corresponding to the target bearer; and a storage module, configured to save a mapping relationship between the first EBI and the second EBI.

Optionally, the allocation module is further configured to allocate a device to device bearer identity DBI.

Optionally, the core network entity further includes: a sending module, configured to send the first EBI and the DBI to the first UE by using a base station serving the first UE, so that the first UE saves a mapping relationship between the first EBI and the DBI; or the sending module, configured to send an Internet Protocol IP address of the second UE, the first EBI, and the DBI to the first UE by using a base station serving the first UE, so that the first UE saves a mapping relationship between the IP address of the second UE and the first EBI, and the DBI.

Optionally, the core network entity further includes: a sending module, configured to send the identity of the second UE to the first UE by using the base station serving the first UE, so that the first UE learns that the target bearer is set up for the second UE.

Optionally, the core network entity further includes: a sending module, configured to send a TFT to the first UE by using the base station serving the first UE, where a value of the TFT is null; and/or a sending module, configured to send an LBI to the first UE by using the base station serving the first UE, where a value of the LBI is 0.

Optionally, the sending module is further configured to send the second EBI and the DBI to the second UE by using the first UE, so that the second UE saves a mapping relationship between the second EBI and the DBI.

Optionally, the setup module is specifically configured to: send, to a base station serving the first UE, a tunnel endpoint identifier TEID that is of the first gateway and that corresponds to the second EBI, and the first EBI; and send, to the first gateway, a TEID that is of the base station and that corresponds to the first EBI, and the second EBI, so that the first gateway establishes a tunnel connection to the base station.

Optionally, the setup module is specifically configured to send a sixth message to the second gateway by using the first gateway, so that the second gateway modifies a current mapping target of a TFT of the second UE from a bearer corresponding to the second EBI to the target bearer, where the current target of the TFT of the second UE is the bearer corresponding to the second EBI, and the target bearer has same QoS as the bearer corresponding to the second EBI.

Optionally, the sixth message includes an identity of the second UE and the second EBI.

Optionally, the first message includes a non-access stratum NAS message of the second UE; or the first message includes a NAS message of the second UE and the identity of the second UE.

Optionally, the NAS message is generated by the second UE, the second UE sends the NAS message to the first UE by using an interface between the second UE and the first UE, and the first UE sends the NAS message to the core network entity by using the first message.

Optionally, the core network entity further includes: a receiving module, configured to receive a seventh message sent by the first UE, where the seventh message includes the NAS message of the second UE, where the NAS message of the second UE is used to request to modify the bearer corresponding to the second EBI of the second UE; a mapping module, configured to: when it is learnt that QoS of the bearer corresponding to the second EBI needs to be modified to second QoS, obtain through mapping the first EBI according to the mapping relationship between the second EBI and the first EBI; and a modification module, configured to modify a bearer corresponding to the first EBI on the first UE, so that the bearer corresponding to the first EBI satisfies a bearer of the second QoS.

Optionally, the core network entity further includes: a receiving module, configured to receive a seventh message sent by the first UE, where the seventh message includes the NAS message of the second UE, where the NAS message of the second UE is used to request to modify the bearer corresponding to the second EBI of the second UE; and the setup module is further configured to: when it is learnt that QoS of the bearer corresponding to the second EBI needs to be modified to second QoS and the core network entity determines that there is no bearer satisfying the second QoS on the first UE currently, set up, by the core network entity, a bearer satisfying the second QoS on the first UE.

Optionally, the NAS message includes: a NAS TAU message; or a NAS attach message; or a NAS request bearer resource modification message.

Optionally, the target bearer is a bearer between the first UE and the first gateway; or the target bearer is a bearer between the first UE and the second gateway.

A fifth aspect of the present invention provides user equipment. The user equipment includes a sending module, configured to send a first message to a core network entity, The core network entity sets up a target bearer on the first UE according to the first message, and second UE transmits data by using the target bearer.

Optionally, the user equipment further includes: an obtaining module, configured to obtain a first evolved packet system bearer identity EBI, where the first EBI is an EBI corresponding to the target bearer; an allocation module, configured to allocate a device to device bearer identity DBI; and a storage module, configured to save a mapping relationship between the first EBI and the DBI; or the obtaining module, further configured to obtain an Internet Protocol IP address of the second UE, where the first UE saves a mapping relationship between the IP address of the second UE and the first EBI, and the DBI.

Optionally, the sending module is further configured to send the DBI and QoS of the target bearer to the second UE, so that the second UE learns that QoS of a bearer corresponding to a second EBI on the second UE is the same as the QoS of the target bearer, and saves a mapping relationship between the second EBI and the DBI.

Optionally, the receiving module is further configured to receive a first EBI corresponding to the target bearer and a DBI that are sent by the core network entity by using a base station serving the first UE; and the storage module is further configured to save a mapping relationship between the first EBI and the DBI; or the receiving module is further configured to receive an IP address of the second UE, the first EBI, and a DBI that are sent by the core network entity by using a base station serving the first UE; and the storage module is further configured to save a mapping relationship between the IP address of the second UE and the first EBI, and the DBI.

Optionally, the receiving module is further configured to receive an identity of the second UE sent by the core network entity by using the base station serving the first UE; and the first UE learns, according to the identity of the second UE, that the target bearer is set up by the core network entity for the second UE.

Optionally, the receiving module is further configured to receive a TFT that is sent by the core network entity by using the base station serving the first UE, where a value of the TFT is null; and/or the receiving module is further configured to receive an LBI that is sent by the core network entity by using the base station serving the first UE, where a value of the LBI is 0.

Optionally, the sending module includes: a receiving unit, configured to receive a sixth message sent by the second UE, where the sixth message includes a non-access stratum NAS message sent by the second UE to the core network entity; an obtaining unit, configured to obtain the NAS message; and a sending unit, configured to send the NAS message to the core network entity by using the first message.

Optionally, the obtaining unit is specifically configured to: learn, according to indication information, that the sixth message includes the NAS message, and obtain the NAS message from the sixth message, where the sixth message includes the indication information indicating that the sixth message includes the NAS message.

Optionally, the first message includes the NAS message of the second UE; or the first message includes the NAS message of the second UE and the identity of the second UE.

Optionally, the sending module is further configured to send a seventh message to the core network entity, where the seventh message includes the NAS message of the second UE, where the NAS message of the second UE is used to request to modify the bearer corresponding to the second EBI of the second UE.

Optionally, the first UE receives an eighth message sent by the core network entity, and learns that the eighth message includes the NAS message sent to the first UE; and the first UE obtains the NAS message, and sends the NAS message to the second UE.

Optionally, the first message includes indication information indicating that the first message includes another NAS message; and the eighth message includes indication information indicating that the eighth message includes another NAS message.

Optionally, the sending module is specifically configured to send a ninth message to the second UE, where the ninth message includes indication information indicating that the ninth message includes the NAS message.

Optionally, the receiving module is further configured to: receive data that is sent by the second UE by using a bearer corresponding to the DBI, where the first UE sends, according to the mapping relationship between the DBI and the first EBI, the data to a network by using the target bearer corresponding to the first EBI; or the receiving module is further configured to: receive data that is sent by the second UE by using a bearer corresponding to the DBI, where the first UE sends, according to the mapping relationship between the IP address of the second UE and the first EBI, and the DBI, the data to a network by using the target bearer corresponding to the first EBI.

Optionally, the receiving module is further configured to: receive data that is sent by the network by using the target bearer corresponding to the first EBI, where the first UE sends, according to the mapping relationship between the first EBI and the DBI, the data to the second UE by using the bearer corresponding to the DBI; or the receiving module is further configured to: receive data that is sent by the network by using the target bearer corresponding to the first EBI, where the first UE sends, according to a mapping relationship between the first EBI and a destination IP address of the data, and the DBI, the data to the second UE by using the bearer corresponding to the DBI.

Optionally, the NAS message includes: a NAS TAU message; or a NAS attach message; or a NAS request bearer resource modification message.

A sixth aspect of the present invention provides user equipment. The user equipment includes a sending module, configured to send a first message to a core network entity using first UE. The core network entity sets up a target bearer on the first UE according to the first message. The user equipment also includes a data transmission module, configured to transmit data by using the target bearer.

Optionally, the sending module includes: a generation unit, configured to generate a NAS message sent to the core network entity; and a sending unit, configured to send a sixth message to the first UE, so that the first UE obtains the NAS message from the sixth message, and sends the NAS message to the core network entity by using the first message.

Optionally, the sending unit is specifically configured to: learn, according to indication information, that the sixth message includes the NAS message, and obtain the NAS message from the sixth message, where the sixth message includes the indication information indicating that the sixth message includes the NAS message.

Optionally, the user equipment further includes: a receiving module, configured to: after the sending module sends the first message to the core network entity by using the first UE, receive an eighth message sent by the first UE, where the eighth message includes indication information indicating that the eighth message includes the NAS message; and an obtaining module, configured to: learn, according to the indication information, that the eighth message includes the NAS message, and obtain the NAS message.

Optionally, the user equipment further includes: a receiving module, configured to: after the sending module sends the first message to the core network entity by using the first UE, receive a second EBI and a DBI that are sent by the first UE; and a storage module, configured to save a mapping relationship between the second EBI and the DBI.

Optionally, the user equipment further includes: a receiving module, configured to: receive a ninth message sent by the first UE, where the ninth message includes a DBI and QoS, the second UE learns that QoS of a bearer corresponding to a second EBI is the same as the QoS included in the ninth message, and the second UE saves a mapping relationship between the second EBI and the DBI.

Optionally, the data transmission module is specifically configured to: when it is determined according to a TFT that the data needs to be sent by using the bearer corresponding to the second EBI, send the data to the first UE by using a bearer corresponding to the DBI.

A seventh aspect of the present invention provides a communications system, including a core network entity, first UE, and second UE. The core network device is the core network device according to the fourth aspect. The first UE is the first UE according to the fifth aspect. The second UE is the second UE according to the sixth aspect.

By means of the foregoing technical solutions, a core network entity receives a first message sent by first user equipment UE; and the core network entity sets up a target bearer on the first UE according to the first message, so that second UE transmits data by using the target bearer. Different from the prior art, the second UE transmits the data by using the target bearer, that is, when the second UE changes between working modes of accessing a network by itself and accessing the network by using the first UE, the data is transmitted by using the target bearer, and an IP address remains unchanged; therefore, continuity of the IP address can be ensured, communication is not interrupted, and QoS of a related service of the second UE is also ensured.

DETAILED DESCRIPTION OF ILLUSTRATIVE EMBODIMENTS

Figure 1:
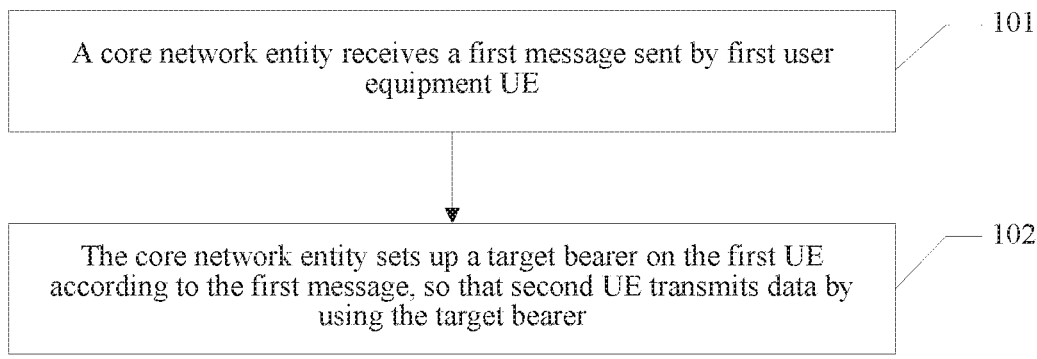
FIG. 1 is a schematic flowchart of a data transmission method according to an embodiment of the present invention.
Figure 2:
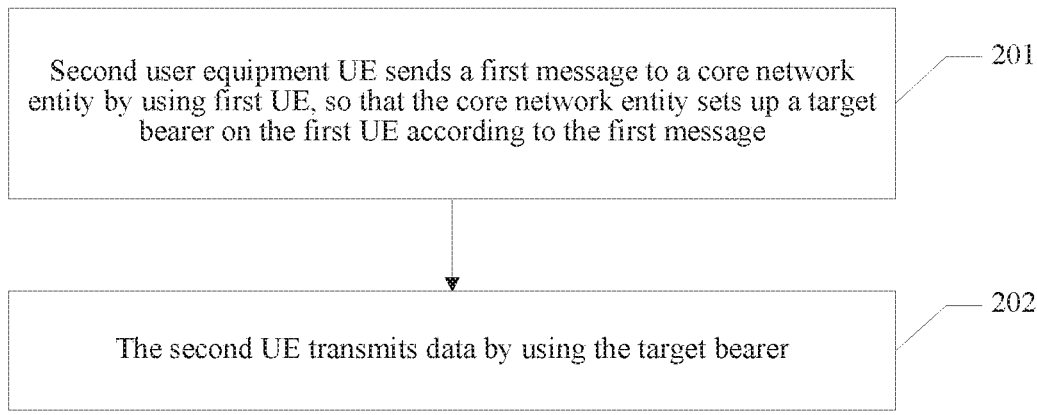
FIG. 2 is another schematic flowchart of a data transmission method according to an embodiment of the present invention.

Embodiments of the present invention provide a data transmission method, a related device, and a system, so as to ensure continuity of an IP address and QoS of a related service when a wearable device changes between different working modes.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In the specification, claims, and accompanying drawings of the present invention, the terms "first", "second", "third", "fourth", and so on are intended to distinguish between different objects but do not indicate a particular order. In addition, the terms "including", "containing", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The technical solutions of the present invention may be applied to various communications systems, such as: a Global System for Mobile Communications (GSM), a Code Division Multiple Access (CDMA) system, Wideband Code Division Multiple Access (WCDMA), a general packet radio service (GPRS), and Long Term Evolution (LTE).

First, it is noted that a core network entity mentioned in the embodiments of the present invention refers to an entity that can implement a mobility management logic function of user equipment. The core network entity may have different names, locations, and product forms in different networks.

For example, the core network entity mentioned in the embodiments of the present invention may refer to: a mobile management entity (MME) connected to an evolved Universal Mobile Telecommunications System (UMTS) terrestrial radio access network (E-UTRAN); a serving general packet radio service support node (Serving GPRS (SGSN) connected to a UMTS terrestrial radio access network (UTRAN)/a GSM EDGE radio access network (GERAN); an access gateway (AGW) in a non-3GPP network; an entity having a mobile management logic function of an evolved packet data gateway (EPDG) in a wireless local area network (WLAN); an access service network gateway (ASN GW) in a Worldwide Interoperability for Microwave Access (WiMAX) network; an entity having an access mobile management logic function of a high rate packet data access network (HRPD-AN) in a Wideband Code Division Multiple Access (CDMA) network; or an entity implementing mobile management logic function of user equipment in another network.

First UE may be a mobile terminal, mobile user equipment, or the like, and may communicate with one or more core networks by using a radio access network (RAN). The first UE may be a mobile terminal, for example, a mobile phone (or referred to as a "cellular" phone) or a computer having a mobile terminal. For example, the first UE may be a portable, pocket-sized, handheld, computer-built in, or in-vehicle mobile apparatus. The first UE exchanges a language and/or data with the radio access network.

Second UE may be a wearable device/equipment (Wearable Device, (WD) or Wearable Equipment (WE)) or the like. The wearable device is a portable device that is directly body-worn or that is integrated into clothes or an accessory of a user. The wearable device, for example, a smart watch, a smart wrist strap, or smart glasses, is not only a hardware device, but also implements a strong function by means of software support, data exchange, or cloud interaction. This is not limited in the present invention.

A first gateway may be a serving gateway (SGW), or the like.

A second gateway may be a packet data network gateway (PGW), or the like. The first gateway and the second gateway are gateways serving the first UE or are gateways serving the second UE. This is not limited in the present invention.

A base station may be a base transceiver station (BTS) in GSM or CDMA, or may be a NodeB (Node B) in WCDMA, or may be an evolved NodeB (evolutional Node B, eNB or e-Node B) in LTE. This is not limited in the present invention.

Referring to FIG. 1, an embodiment of a data transmission method in an embodiment of the present invention, which is specifically an embodiment of a data transmission method on a core network entity side, includes: receiving, by a core network entity, a first message sent by first user equipment UE; and setting up, by the core network entity, a target bearer on the first UE according to the first message, so that second UE transmits data by using the target bearer.

A specific process is as follows.

101: A core network entity receives a first message sent by first user equipment UE.

In this embodiment of the present invention, the first UE and second UE are in a connected state by using a PC5 interface. A specific connection process is: The second UE sends an association request to the first UE, where the association request indicates that the second UE expects to be connected to the first UE. Further, the first UE receives the association request, and sends an association request response message to the second UE by using the PC5 interface, so that a connection is established between the first UE and the second UE.

After a connection relationship is established between the first UE and the second UE, the second UE further generates a non-access stratum (NAS) message. The second UE encapsulates the NAS message in a NAS transport request message on the PC5 or in an uplink NAS transport request message on the PC5, and sends, to the first UE by using the PC5 interface, the NAS transport request message on the PC5 or the uplink NAS transport request message on the PC5. The first UE obtains the NAS message of the second UE from the NAS transport request message on the PC5 or the uplink NAS transport request message on the PC5, and encapsulates the NAS message of the second UE in the first message. The first UE sends the first message to the core network entity, where the first message includes the NAS message of the second UE. Optionally, the first message includes an identity of the second UE. The first message may be an uplink generic NAS transport uplink generic NAS transport message or an uplink NAS transport uplink NAS transport message.

102: The core network entity sets up a target bearer on the first UE according to the first message, so that second UE transmits data by using the target bearer.

Further, after receiving the first message sent by the first UE, the core network entity sets up the target bearer on the first UE according to the first message. This may be implemented in the following several manners, and is not specifically limited herein.

In an optional implementation, the core network entity obtains first bearer context, where the first bearer context is bearer context corresponding to a second evolved packet system bearer identity EBI of the second UE; and the core network entity sets up the target bearer on the first UE according to the first bearer context. In another optional implementation, the core network entity obtains first bearer context, where the first bearer context is bearer context corresponding to a second EBI of the second UE; the core network entity obtains first quality of service QoS from the first bearer context, where the first QoS is QoS of a current bearer corresponding to the second EBI; when the core network entity determines that no bearer satisfying the first QoS exists on the first UE, the core network entity sends a second message to a second gateway by using a first gateway, so that the second gateway sends a third message to the core network entity by using the first gateway; and the core network entity sets up, according to the third message, the target bearer satisfying the first QoS on the first UE.

It should be noted that the second message may be a bearer resource command bearer resource command message. The third message may be a create bearer request create bearer request message. This is not specifically limited herein.

Further, the second message includes a linked evolved packet system bearer identity LBI, where a value of the LBI is 0; and the third message includes a traffic flow template TFT, where a value of the TFT is null.

Further, when the core network entity obtains the first bearer context, the following several manners may be used for implementation. This is not specifically limited herein.

In the foregoing solution, the core network entity obtains the identity of the second UE, obtains context of the second UE according to the identity of the second UE, further obtains, from the context of the second UE, the bearer context corresponding to the second EBI of the second UE, and sets up the target bearer on the first UE. In an optional implementation, the core network entity obtains, by using the identity of the second UE, context of the second UE from locally saved second bearer context of the second UE, and obtains the first bearer context from the context of the second UE; or the core network entity obtains, by using the identity of the second UE, another core network entity currently saving the second UE other than the core network entity, obtains context of the second UE from the another core network entity, and obtains the first bearer context from the context of the second UE.

In an optional implementation, the first message includes the identity of the second UE, and the core network entity obtains the identity of the second UE from the first message; or a NAS message of the first UE includes the identity of the second UE, and the core network entity obtains the identity of the second UE from the NAS message of the second UE.

In this case, the identity of the second UE may be a GUTI (Globally Unique Temporary UE Identity).

In another optional implementation, the core network entity selects, for the second UE, a first gateway and a second gateway that are the same as a first gateway and a second gateway of the first UE; the core network entity sends a fourth message to the second gateway by using the first gateway, so that the second gateway sends a fifth message to the core network entity by using the first gateway; and the core network entity obtains the first bearer context from the fifth message.

It should be noted that the fourth message may be a create session request create session request message. Correspondingly, the fifth message may be a create session response create session response message. This is not specifically limited herein.

Further, in some optional embodiments, after the core network entity receives the first message sent by the first user equipment UE, the core network entity allocates a first EBI, where the first EBI is an EBI corresponding to the target bearer; and the core network entity saves a mapping relationship between the first EBI and the second EBI.

Further, after the receiving, by a core network entity, a first message sent by first user equipment UE, the method further includes: allocating, by the core network entity, a device to device bearer identity (DBI), where the DBI is used to identify a bearer used to transmit data when two devices perform direct communication.

In some optional embodiments, the core network entity sends the first EBI and the DBI to the first UE by using a base station serving the first UE, so that the first UE saves a mapping relationship between the first EBI and the DBI; or the core network entity sends an Internet Protocol IP address of the second UE, the first EBI, and the DBI to the first UE by using a base station serving the first UE, so that the first UE saves a mapping relationship between the IP address of the second UE and the first EBI, and the DBI, that is, the first UE saves a mapping relationship between (the IP address of the second UE and the first EBI) and the DBI.

It should be noted that the core network entity locally saves the IP address of the second UE.

In some optional embodiments, the core network entity sends the identity of the second UE to the first UE by using the base station serving the first UE, so that the first UE learns that the target bearer is set up for the second UE.

In some optional embodiments, the core network entity sends a TFT to the first UE by using the base station serving the first UE, where a value of the TFT is null; and/or the core network entity sends an LBI to the first UE by using the base station serving the first UE, where a value of the LBI is 0.

Further, after the setting up, by the core network entity, a target bearer on the first UE, the method further includes: sending, by the core network entity, the second EBI and the DBI to the second UE by using the first UE, so that the second UE saves a mapping relationship between the second EBI and the DBI.

Further, the setting up, by the core network entity, a target bearer on the first UE according to the first message may be specifically implemented in the following several manners.

In an optional implementation, the core network entity sends, to a base station serving the first UE, a tunnel endpoint identifier TEID that is of the first gateway and that corresponds to the second EBI, and the first EBI; and the core network entity sends, to the first gateway, a TEID that is of the base station and that corresponds to the first EBI, and the second EBI, so that the first gateway establishes a tunnel connection to the base station.

In another optional implementation, the core network entity sends a sixth message to the second gateway by using the first gateway, so that the second gateway modifies a current mapping target of a TFT of the second UE from a bearer corresponding to the second EBI to the target bearer, where the sixth message may be a create bearer response create bearer response message, and the target bearer has same QoS as the bearer corresponding to the second EBI.

It should be noted that the sixth message may be a create bearer response create bearer response message. This is not specifically limited herein.

The sixth message includes an identity of the second UE and the second EBI.

Further, in some optional embodiments, the core network entity receives a seventh message sent by the first UE, where the seventh message includes the NAS message of the second UE, and the seventh message may be a request bearer resource modification request bearer resource modification message, where the NAS message of the second UE is used to request to modify the bearer corresponding to the second EBI of the second UE; when the core network entity learns that QoS of the bearer corresponding to the second EBI needs to be modified to second QoS, the core network entity obtains through mapping the first EBI according to the mapping relationship between the second EBI and the first EBI, where the second QoS is QoS obtained after the QoS of the bearer of the second EBI is modified; and the core network entity modifies a bearer corresponding to the first EBI on the first UE, so that the bearer corresponding to the first EBI satisfies a bearer of the second QoS.

Herein, the obtaining through mapping the first EBI according to the mapping relationship between the second EBI and the first EBI may be specifically: obtaining through mapping, by the core network entity, the first EBI according to the mapping relationship between the second EBI and the first EBI; or obtaining through mapping, by the core network entity, the first EBI of the first UE according to the second EBI of the second UE, for example, obtaining through mapping the first EBI according to a mapping relationship between the identity (for example, an IMSI, International Mobile Subscriber Identity, international mobile subscriber identity) of the second UE and the second EBI, and an identity of the first UE and the first EBI, that is, (the identity of the second UE, the second EBI)↔(the identity of the first UE, the first EBI), or obtaining through mapping, by the core network entity, the first EBI according to the mapping relationship between the second EBI and the first EBI, and further determining, by the core network entity, that the first EBI is on the first UE (for example, obtaining through mapping, by the core network entity, the first UE according to a mapping relationship between the identity of the second UE and an identity of the first UE), so as to obtain through mapping the first EBI.

It should be noted that during actual application, a manner of obtaining through mapping the first EBI according to the mapping relationship between the second EBI and the first EBI is not limited to any of the foregoing manners, and may be another manner. This is not specifically limited herein.

Further, in some optional embodiments, the core network entity receives a seventh message sent by the first UE, where the seventh message includes the NAS message of the second UE, and the seventh message may be a request bearer resource modification request bearer resource modification message; the NAS message of the second UE is used to request to modify the bearer corresponding to the second EBI of the second UE; and when the core network entity learns that QoS of the bearer corresponding to the second EBI needs to be modified to second QoS and the core network entity determines that there is no bearer satisfying the second QoS on the first UE currently, setting up, by the core network entity, a bearer satisfying the second QoS on the first UE.

It should be noted that the NAS message includes: a NAS TAU message, or a NAS attach message, or a NAS request bearer resource modification message. This is not specifically limited herein.

It should be noted that the target bearer is a bearer between the first UE and the first gateway. Alternatively, the target bearer is a bearer between the first UE and the second gateway. This is not specifically limited herein.

If the target bearer is a bearer between the first UE and the first gateway, the target bearer may be referred to as an E-RAB (E-UTRAN Radio Access Bearer). If the target bearer is a bearer between the first UE and the second gateway, the target bearer may be referred to as an EPS (Evolved Packet System) bearer. In this embodiment of the present invention, a core network entity receives a first message sent by first user equipment UE; and the core network entity sets up a target bearer on the first UE according to the first message, so that second UE transmits data by using the target bearer. Different from the prior art, the second UE transmits the data by using the target bearer, that is, when the second UE changes between working modes of accessing a network by itself and accessing the network by using the first UE, the data is transmitted by using the target bearer, and an IP address remains unchanged; therefore, continuity of the IP address can be ensured, communication is not interrupted, and QoS of a related service of the second UE is also ensured.

Based on the embodiment shown in FIG. 1, an embodiment of a data transmission method on a first UE side is further described, including: sending, by first user equipment UE, a first message to a core network entity, so that the core network entity sets up a target bearer on the first UE according to the first message, and second UE transmits data by using the target bearer.

In some optional embodiments, after the sending, by first user equipment UE, a first message to a core network entity, the method further includes: obtaining, by the first UE, a first evolved packet system bearer identity EBI, where the first EBI is an EBI corresponding to the target bearer; allocating, by the first UE, a device to device bearer identity DBI; and saving, by the first UE, a mapping relationship between the first EBI and the DBI; or obtaining, by the first UE, an Internet Protocol IP address of the second UE, and saving, by the first UE, a mapping relationship between the IP address of the second UE and the first EBI, and the DBI, that is, (the IP address of the second UE, the first EBI)↔the DBI.

Further, after the allocating, by the first UE, a device to device bearer identity DBI, the method further includes: sending, by the first UE, the DBI and QoS of the target bearer to the second UE, so that the second UE learns that QoS of a bearer corresponding to a second EBI on the second UE is the same as QoS of the target bearer, and saves a mapping relationship between the second EBI and the DBI.

Further, in some optional embodiments, after the sending, by first user equipment UE, a first message to a core network entity, the method further includes: receiving, by the first UE, a first EBI corresponding to the target bearer and a DBI that are sent by the core network entity by using a base station serving the first UE; and saving, by the first UE, a mapping relationship between the first EBI and the DBI; or receiving, by the first UE, an IP address of the second UE, the first EBI, and a DBI that are sent by the core network entity by using a base station serving the first UE; and saving, by the first UE, a mapping relationship between the IP address of the second UE and the first EBI, and the DBI, that is, (the IP address of the second UE, the first EBI)↔the DBI.

Further, the first UE receives an identity of the second UE that is sent by the core network entity by using the base station serving the first UE; and the first UE learns, according to the identity of the second UE, that the target bearer is set up by the core network entity for the second UE.

Further, the method further includes: receiving, by the first UE, a TFT that is sent by the core network entity by using the base station serving the first UE, where a value of the TFT is null; and/or receiving, by the first UE, an LBI that is sent by the core network entity by using the base station serving the first UE, where a value of the LBI is 0.

In some optional embodiments, the sending, by first equipment UE, a first message to a core network entity includes: receiving, by the first UE, a sixth message sent by the second UE, where the sixth message includes a non-access stratum NAS message sent by the second UE to the core network entity; and obtaining, by the first UE, the NAS message, and sending the NAS message to the core network entity by using the first message.

Further, the obtaining, by the first UE, the NAS message includes: the sixth message includes indication information indicating that the sixth message includes the NAS message; and learning, by the first UE according to the indication information, that the sixth message includes the NAS message, and obtaining the NAS message from the sixth message, where the sixth message may be a NAS transport request message that is on a PC5 interface and that is used to transmit the NAS message or an uplink NAS transport request message that is on a PC5 interface and that is used to transmit the NAS message.

It should be noted that the first message includes the NAS message of the second UE. Alternatively, the first message includes the NAS message of the second UE and the identity of the second UE. This is not specifically limited herein.

In some optional embodiments, after the sending, by first user equipment UE, a first message to a core network entity, the method includes: sending, by the first UE, a seventh message to the core network entity, where the seventh message includes the NAS message of the second UE, and the seventh message may be a request bearer resource modification message, where the NAS message of the second UE is used to request to modify the bearer corresponding to the second EBI of the second UE.

In some optional embodiments, after the sending, by first user equipment UE, a first message to a core network entity, the method includes: receiving, by the first UE, an eighth message sent by the core network entity, and learning that the eighth message includes the NAS message sent to the first UE, where the eighth message may be a downlink generic NAS transport downlink generic NAS transport message or a downlink NAS transport downlink NAS transport message, and the indication information may be of a generic message container type generic message container type; and obtaining, by the first UE, the NAS message, and sending the NAS message to the second UE.

It should be noted that the first message includes indication information indicating that the first message includes another NAS message; and/or the eighth message includes indication information indicating that the eighth message includes another NAS message.

In some optional embodiments, the sending the NAS message to the second UE includes: sending, by the first UE, a ninth message to the second UE, where the ninth message includes indication information indicating that the ninth message includes the NAS message, and the ninth message may be a NAS transport request message on the PC5 interface or a downlink NAS transport request message on the PC5 interface.

In some optional embodiments, the method further includes: receiving, by the first UE, data that is sent by the second UE by using a bearer corresponding to the DBI, and sending, by the first UE according to the mapping relationship between the DBI and the first EBI, the data to a network by using the target bearer corresponding to the first EBI; or receiving, by the first UE, data that is sent by the second UE by using a bearer corresponding to the DBI, and sending, by the first UE according to the mapping relationship between the IP address of the second UE and the first EBI, and the DBI, the data to a network by using the target bearer corresponding to the first EBI.

In some optional embodiments, the method further includes: receiving, by the first UE, data that is sent by the network by using the target bearer corresponding to the first EBI, and sending, by the first UE according to the mapping relationship between the first EBI and the DBI, the data to the second UE by using the bearer corresponding to the DBI; or receiving, by the first UE, data that is sent by the network by using the target bearer corresponding to the first EBI, and sending, by the first UE according to a mapping relationship between the first EBI and a destination IP address of the data, and the DBI, the data to the second UE by using the bearer corresponding to the DBI.

It should be noted that the NAS message includes: a NAS TAU message, or a NAS attach message, or a NAS request bearer resource modification message. This is not specifically limited herein.

In this embodiment of the present invention, first user equipment UE sends a first message to a core network entity, so that the core network entity sets up a target bearer on the first UE according to the first message, and second UE transmits data by using the target bearer. Different from the prior art, the second UE transmits the data by using the target bearer, that is, when the second UE changes between working modes of accessing a network by itself and accessing the network by using the first UE, the data is transmitted by using the target bearer, and an IP address remains unchanged; therefore, continuity of the IP address can be ensured, communication is not interrupted, and QoS of a related service of the second UE is also ensured.

Based on the foregoing embodiments, an embodiment of a data transmission method on a second UE side is further described, including: sending, by second user equipment UE, a first message to a core network entity by using first UE, so that the core network entity sets up a target bearer on the first UE according to the first message; and transmitting, by the second UE, data by using the target bearer.

Details are as follows.

201: Second user equipment UE sends a first message to a core network entity by using first UE, so that the core network entity sets up a target bearer on the first UE according to the first message.

202: The second UE transmits data by using the target bearer.

In some optional embodiments, the sending, by second user equipment UE, a first message to a core network entity by using first UE includes: generating, by the second UE, a NAS message sent to the core network entity, and sending the NAS message to the first UE by using a sixth message, so that the first UE obtains the NAS message from the sixth message, and sends the NAS message to the core network entity by using the first message.

Further, the sending the NAS message to the first UE by using a sixth message, so that the first UE obtains the NAS message from the sixth message includes: the sixth message includes indication information indicating that the sixth message includes the NAS message, so that the first UE learns, according to the indication information, that the sixth message includes the NAS message, and obtains the NAS message from the sixth message.

In some optional embodiments, after the sending, by second user equipment UE, a first message to a core network entity by using first UE, the method includes: receiving, by the second UE, an eighth message sent by the first UE, where the eighth message includes indication information indicating that the eighth message includes the NAS message; and learning, by the second UE according to the indication information, that the eighth message includes the NAS message, and obtaining the NAS message.

In some optional embodiments, after the sending, by second user equipment UE, a first message to a core network entity by using first UE, the method includes: receiving, by the first UE, a second EBI and a DBI that are sent by the first UE; and saving, by the second UE, a mapping relationship between the second EBI and the DBI.

In some optional embodiments, after the sending, by second user equipment UE, a first message to a core network entity by using first UE, the method includes: receiving, by the second UE, a ninth message sent by the first UE, where the ninth message includes a DBI and QoS, learning, by the second UE, that QoS of a bearer corresponding to the second EBI is the same as the QoS included in the ninth message, and saving, by the second UE, a mapping relationship between the second EBI and the DBI.

Further, the transmitting, by the second UE, data by using the target bearer includes: when the second UE determines, according to a TFT, that the data needs to be sent by using the bearer corresponding to the second EBI, sending, by the second UE, the data to the first UE by using a bearer corresponding to the DBI.

In this embodiment of the present invention, second user equipment UE sends a first message to a core network entity by using first UE, so that the core network entity sets up a target bearer on the first UE according to the first message; and the second UE transmits data by using the target bearer. Different from the prior art, the second UE transmits the data by using the target bearer, that is, when the second UE changes between working modes of accessing a network by itself and accessing the network by using the first UE, the data is transmitted by using the target bearer, and an IP address remains unchanged; therefore, continuity of the IP address can be ensured, communication is not interrupted, and QoS of a related service of the second UE is also ensured.

Figure 3:
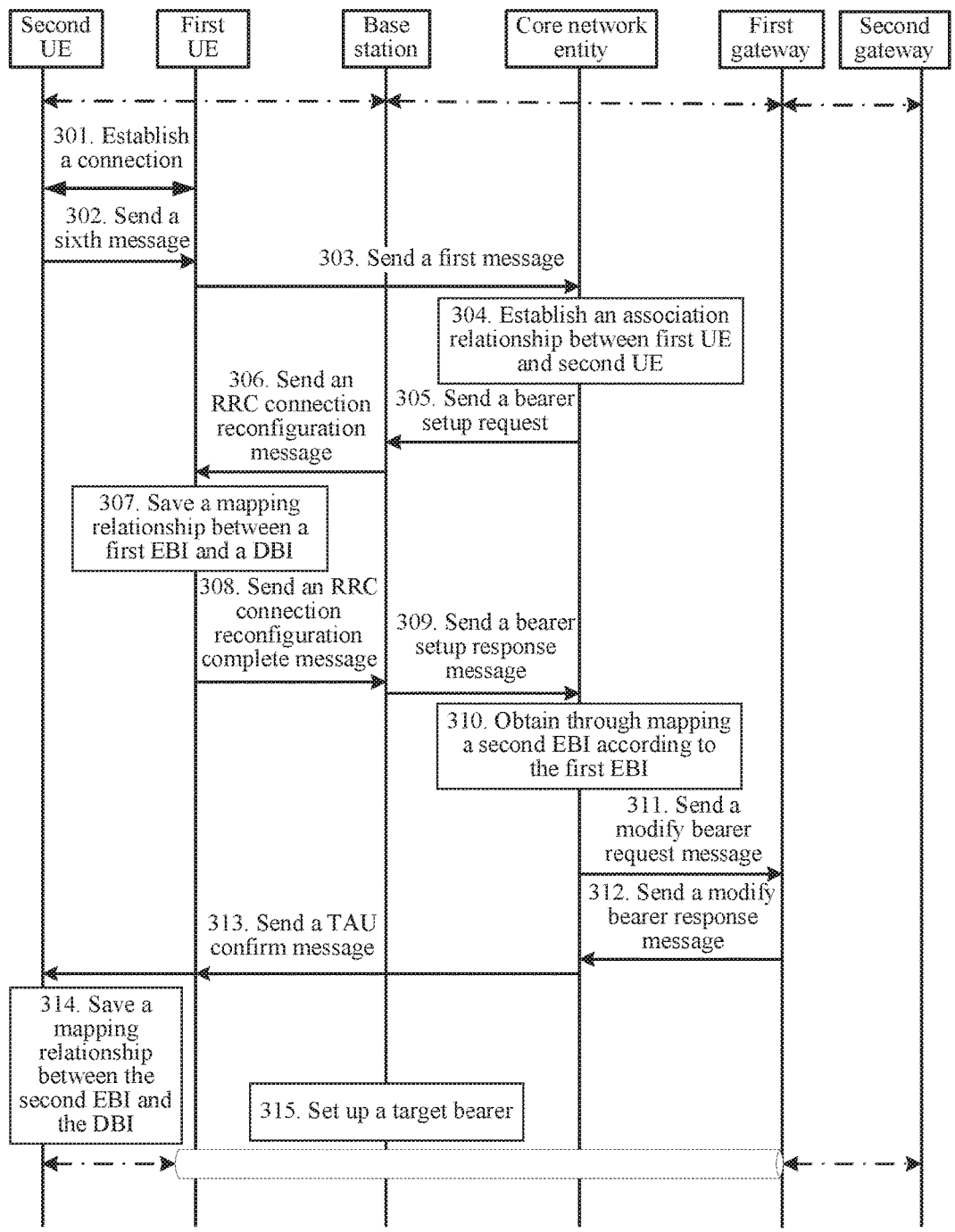
FIG. 3 is another schematic flowchart of a data transmission method according to an embodiment of the present invention.

Based on the foregoing embodiments, referring to FIG. 3, an embodiment of an application scenario of data transmission is further described. In this embodiment, an example in which the target bearer is used for data transmission between the first UE and the first gateway is used. A process of accessing, by the second UE after independently attaching to the core network entity, a network by using the first UE is specifically as follows.

301: First UE establishes a connection to second UE.

The first UE may establish the connection to the second UE by using an interface, where the interface may be PC5. This is not specifically limited herein.

302: The second UE sends a sixth message to the first UE.

The second UE generates the sixth message, and may send the sixth message to the first UE by using the PC5 interface. The sixth message includes a NAS tracking area update (TAU) message. Optionally, the sixth message further includes an identity of the second UE. The identity of the second UE has a property of uniquely identifying the second UE, and may be any one or more of an international mobile equipment identity (IMEI), a mobile station international integrated services digital network number (MSISDN), a globally unique temporary UE identity (GUTI), or an IP multimedia public identity (IMPU).

It should be noted that the identity of the second UE may be a field that is independent of the TAS TAU message, or may be carried in the TAS TAU message. This is not specifically limited herein.

303: The first UE sends a first message to a core network entity.

The core network entity may be an MME serving the first UE.

The first UE obtains a NAS message of the second UE from the sixth message, and encapsulates the NAS message in the first message.

When the first UE is in an idle state, the first UE may enter a connected state by sending a service request service request message to the MME serving the first UE, and send the first message to the core network entity. When the first UE is in the connected state, the first UE directly sends the first message to the core network entity.

The first UE may encapsulate the first message in a special NAS message and send the special NAS message to the core network entity. The special NAS message may be: reusing an existing NAS message or a newly defined NAS message. For example, the reusing an existing message may be: reusing existing uplink generic NAS transport (UPLINK GENERIC NAS TRANSPORT). Content of a generic message container is indicated, by using a newly defined generic message container type generic message container type, as the NAS message of the second UE.

For example, the newly defined NAS message may be an uplink NAS transport (UPLINK NAS TRANSPORT) message or the like. This is not specifically limited herein.

Optionally, the second UE may add, to the sixth message, indication information indicating that the sixth message includes the NAS message. The first UE learns, according to the indication information, that the sixth message includes the NAS message, and obtains the NAS message from the sixth message.

The first UE may add, to the first message, indication information indicating that the first message includes a NAS message of another UE. The core network entity learns, according to the indication information, that the first message includes the NAS message of the another UE, and obtains the NAS message from the first message. If the first message further includes the identity of the second UE, the core network entity learns, according to the identity of the second UE, that the first message includes the NAS message of the second UE. Alternatively, the core network entity learns, according to the identity of the second UE in the NAS message in the first message, that the NAS message in the first message is sent by the second UE.

304: The core network entity establishes an association relationship between the first UE and the second UE.

In the present invention, the core network entity is a core network entity serving the first UE. After receiving the first message sent by the first UE, the core network entity further establishes the association relationship between the first UE and the second UE.

When the core network entity detects that a core network entity serving the second UE is not the core network entity itself, the core network entity changes, by using an existing TAU procedure, the core network entity serving the second UE to the core network entity itself, and further establishes the association relationship between the first UE and the second UE.

Specific steps of changing the core network entity serving the second UE to the core network entity itself includes: obtaining, by the core network entity by using the identity, for example, the GUTI, of the second UE, a core network entity currently serving the second UE, and obtaining, by using a context request message, context information of the second UE from the core network entity currently serving the second UE; modifying, by the core network entity, a bearer of the second UE; updating, by the core network entity, an HSS (Home Subscription Server); and sending, by the HSS, a cancel location cancel location message to the core network entity currently serving the second UE.

Further, the core network entity allocates a first evolved packet system bearer identity (EBI) and a DBI to the first UE according to bearer context of the second UE. In addition, the core network entity establishes a mapping relationship between the first EBI and a second EBI, and further saves the mapping relationship between the first EBI and the second EBI. For example, if the second UE currently has two bearers and corresponding second EBIs (respectively being 5 and 6), and the core network entity allocates two first EBIs (respectively being 8 and 9) and two DBIs (respectively being 1 and 2), the core network entity saves mapping relationships between the first EBIs and the second EBIs as: the second EBI equal to 5↔the first EBI equal to 8; and the second EBI equal to 6↔the first EBI equal to 9.

Herein, the saving, by the core network entity, the mapping relationship between the first EBI and the second EBI may be specifically: saving, by the core network entity, a correspondence between the second EBI and the first EBI in the bearer context of the second UE; or saving, by the core network entity, a correspondence between the second EBI and the first EBI of the first UE in the bearer context of the second UE; or saving, by the core network entity, a correspondence between the second EBI and the first EBI in the bearer context of the second UE, and saving a correspondence between the identity of the second UE and an identity of the first UE.

In addition, the core network entity saves the correspondence between the first EBI and the second EBI in bearer context of the first UE; or the core network entity saves the correspondence between the first EBI and the second EBI of the second UE in bearer context of the first UE; or the core network entity saves the correspondence between the first EBI and the second EBI in bearer context of the first UE, and saves the correspondence between the identity of the first UE and the identity of the second UE.

It should be noted that during actual application, a manner of saving, by the core network entity, the mapping relationship between the first EBI and the second EBI is not limited to any one of the foregoing manners, and may be another manner. This is not specifically limited herein.

Herein, bearer context of UE belongs to part of context of the UE.

305: The core network entity sends a bearer setup request bearer setup request to a base station.

The bearer setup request message includes the first EBI allocated by the core network entity to the first UE, QoS of a target bearer, and a NAS session management request session management request message. The NAS session management request message includes a traffic flow template (TFT), the QoS of the target bearer, a linked evolved packet system bearer identity (Linked EPS Bearer ID, (LBI)), a DBI, and the identity of the second UE.

The TFT is null. The LBI is a reserved value, and may be 0. The QoS of the target bearer is the same as QoS of a bearer corresponding to the second EBI on the second UE. For example, it can be learnt, according to that the second EBI equal to 5 the first EBI equal to 8, that the QoS of the target bearer is the same as QoS corresponding to the second EBI equal to 5.

The bearer setup request message includes the first EBI and a tunnel endpoint identifier (TEID) of a first gateway.

306: The base station sends a radio resource control (RRC) connection reconfiguration message to the first UE.

The bearer setup request message may further carry indication information, so that the base station learns that the target bearer is set up for the second UE. The base station allocates a radio resource to a device to device bearer between the first UE and the second UE, and sends the radio resource to the first UE, so that the first UE and the second UE sets up, by using the radio resource, the device to device bearer indicated by a DBI. Certainly, it may also be that after the first UE learns that a device to device bearer between the first UE and the second UE needs to be set up, the first UE requests a radio resource from the base station, so as to obtain the radio resource from the base station, and set up the device to device bearer. This is not specifically limited herein.

307: The first UE saves a mapping relationship between a first EBI and a DBI.

The first UE learns, according to the identity of the second UE in the NAS session management request, that the target bearer is set up for the second UE, and further saves the mapping relationship between the first EBI and the DBI.

308: The first UE sends an RRC connection reconfiguration complete message to the base station.

309: The base station sends a bearer setup response message to the core network entity.

310: The core network entity obtains through mapping a second EBI according to the first EBI.

The core network entity obtains through mapping the second EBI according to the first EBI and according to the mapping relationship between the first EBI and the second EBI.

311: The core network entity sends a modify bearer request message to a first gateway.

The modify bearer request message includes the second EBI, a tunnel endpoint identifier (TEID) of the base station, and the like.

Therefore, the base station establishes a tunnel connection to a second gateway. The tunnel is used to transmit data by the first UE for the second UE.

312: The first gateway sends a modify bearer response message to the core network entity.

313: The core network entity sends a TAU confirm message to the second UE by using the first UE.

The TAU confirm message carries a mapping relationship between the second EBI and the DBI. Alternatively, the mapping relationship between the second EBI and the DBI and the TAU confirm message are independent fields.

314: The second UE saves a mapping relationship between the second EBI and the DBI.

Further, when there is uplink data in the second UE, after the second UE performs TFT on the uplink data, the second UE obtains the second EBI, and sends the uplink data to the target bearer according to the mapping relationship between the second EBI and the DBI.

Optionally, if the core network entity does not allocate the DBI, after the first UE receives the RRC connection reconfiguration message, the first UE allocates the DBI, and notifies the second UE of the QoS of the target bearer. The second UE obtains through mapping the second EBI and the first EBI according to the QoS of the target bearer, so that after the second UE performs TFT on the uplink data, the second UE obtains the second EBI, and sends the uplink data to the target bearer according to the mapping relationship between the second EBI and the DBI.

Optionally, the second UE may directly modify a mapping target of the TFT from the second EBI to the DBI.

Further, the second UE stops an operation such as monitoring an LTE signal or monitoring paging or sending a TAU.

315: The core network entity sets up a target bearer.

The target bearer includes two parts: an RB (Radio Bearer, radio bearer) between the first UE and the base station and an S1 bearer between the base station and the first gateway. The tunnel set up in step 311 is used for the S1 bearer.

Figure 4:
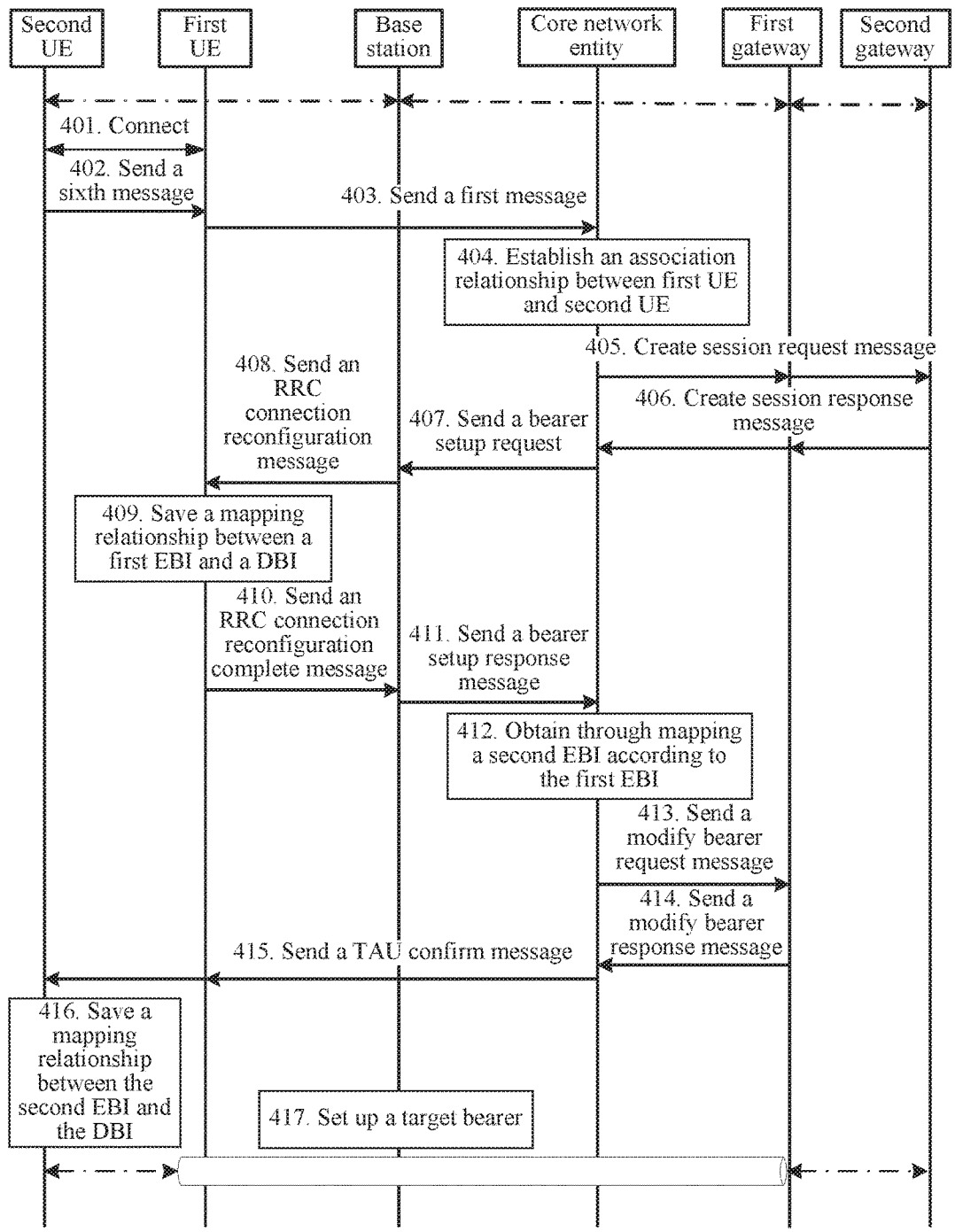
FIG. 4 is another schematic flowchart of a data transmission method according to an embodiment of the present invention.

Based on the embodiment shown in FIG. 3, further, referring to FIG. 4, in this embodiment, an example in which the target bearer is used for data transmission between the first UE and the first gateway is used. A process of accessing, by the second UE after detaching from the core network entity, a network by using the first UE is specifically as follows.

401: First UE and second UE are in a connected state.

The first UE and the second UE are associated with each other.

402: The second UE sends a sixth message to the first UE.

The second UE generates the sixth message, and may send the sixth message to the first UE by using a PC5 interface. The sixth message includes a NAS attach (attach) message. Optionally, the sixth message further includes an identity of the second UE.

403: The first UE sends a first message to a core network entity.

The core network entity may be an MME serving the first UE.

The first UE obtains a NAS message of the second UE from the sixth message, and encapsulates the NAS message in the first message.

When the first UE is in an idle state, the first UE may enter the connected state by sending a service request message to the MME serving the first UE, and send the first message to the core network entity. When the first UE is in the connected state, the first UE directly sends the first message to the core network entity.

It should be noted that the identity of the second UE may be a field that is independent of the TAS attach message, or may be carried in the TAS attach message. This is not specifically limited herein.

In some optional implementations, after the second UE sends the identity (for example, a GUTI) of the second UE to the first UE, the first UE sends, to the core network entity, an attach message carrying the GUTI.

For the NAS message, refer to the description in step 303, and details are not described herein again.

404: The core network entity establishes an association relationship between the first UE and the second UE.

The core network entity obtains context of the second UE according to a NAS attach message of the second UE, and performs authentication on the second UE. When the authentication succeeds, the core network entity allocates a same first gateway and a same second gateway to the second UE and the first UE, allocates a second EBI to the second UE, allocates a first EBI to the first UE, allocates a DBI corresponding to a target bearer, and further saves a mapping relationship between the first EBI and the second EBI. For example, when the second EBI is equal to 5 currently, the core network entity allocates the first EBI (equal to 8) and the DBI (equal to 1), and when saving the mapping relationship between the first EBI and the second EBI, the core network entity records the mapping relationship between the first EBI and the second EBI as: the second EBI equal to 5↔the first EBI equal to 8.

405: The core network entity sends a create session request create session request message to a second gateway by using a first gateway.

The create session request message includes a second EBI of the second UE.

406: The second gateway sends a create session response create session response message to the core network entity by using the first gateway.

407: The core network entity sends a bearer setup request to a base station.

The bearer setup request message includes the first EBI and a tunnel endpoint identifier of the first gateway.

408: The base station sends an RRC connection reconfiguration message to the first UE.

409: The first UE saves a mapping relationship between a first EBI and a DBI.

410: The first UE sends an RRC connection reconfiguration complete message to the base station.

411: The base station sends a bearer setup response message to the core network entity.

412: The core network entity obtains through mapping a second EBI according to the first EBI.

413: The core network entity sends a modify bearer request message to the first gateway.

The modify bearer request message includes the second EBI and a tunnel endpoint identifier of the base station, so that the base station establishes a tunnel connection to the second gateway. The tunnel is used to transmit data by the first UE for the second UE.

414: The first gateway sends a modify bearer response message to the core network entity.

415: The core network entity sends a TAU acknowledgement message to the second UE by using the first UE.

416: The second UE saves a mapping relationship between the second EBI and the DBI.

417: The core network entity sets up a target bearer.

The target bearer includes three parts: an RB (Radio Bearer, radio bearer) between the first UE and the base station, an S1 bearer between the base station and the first gateway, and an S5/S8 bearer between the first gateway and the second gateway. The tunnel set up in step 413 is used for the S1 bearer.

Step 407 to step 417 are the same as or similar to step 305 to step 315 in the embodiment shown in FIG. 3. Specifically, refer to step 305 to step 315 in the embodiment shown in FIG. 3, and details are not described herein again.

Figure 5:
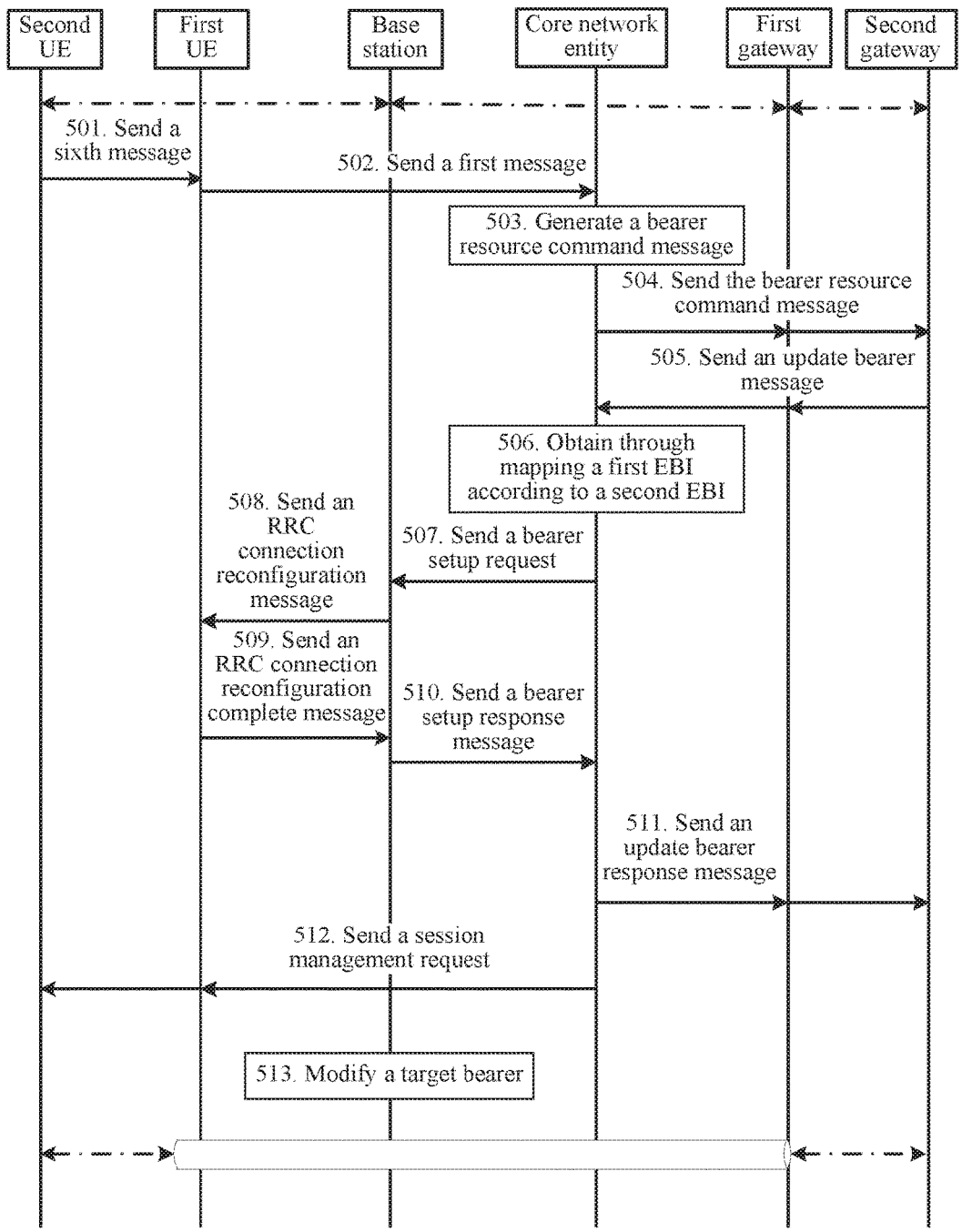
FIG. 5 is another schematic flowchart of a data transmission method according to an embodiment of the present invention.

Based on the embodiments shown in FIG. 3 and FIG. 4, referring to FIG. 5, in this embodiment, an example in which the target bearer is used for data transmission between the first UE and the first gateway is used. A process of initiating, by the second UE, bearer modification is specifically as follows.

501: Second UE sends a sixth message to first UE.

The second UE generates the sixth message, and may send the sixth message to the first UE by using a PC5 interface. The sixth message includes a NAS modify bearer resource request and an identity of the second UE.

502: The first UE sends a first message to a core network entity.

The core network entity may be an MME serving the first UE.

The first UE obtains a NAS message of the second UE from the sixth message, and encapsulates the NAS message in the first message.

When the first UE is in an idle state, the first UE may enter a connected state by sending a service request message to the MME serving the first UE, and send the first message to the core network entity. When the first UE is in the connected state, the first UE directly sends the first message to the core network entity.

503: The core network entity generates a bearer resource command bearer resource command message.

After learning a request to modify a bearer, the core network entity generates the bearer resource command message.

504: The core network entity sends the bearer resource command message to a second gateway by using a first gateway.

The bearer resource command message includes an IMSI of the second UE.

505: The second gateway sends an update bearer request message to the core network entity by using the first gateway.

The second gateway determines, according to a request of the second UE, that a bearer corresponding to a second EBI needs to be modified, and sends the update bearer request message update bearer request message to the core network entity by using the first gateway, where the update bearer request message includes the IMSI of the second UE.

506: The core network entity obtains through mapping a first EBI according to a second EBI.

The core network entity learns that the second gateway updates a bearer of the second UE, and when QoS of a bearer corresponding to the second EBI changes, the core network entity obtains through mapping the first EBI according to the second EBI, and modifies a bearer corresponding to the first EBI.

507: The core network entity sends a bearer setup request to a base station.

The bearer setup request includes the first EBI, QoS of a target bearer, and a NAS session management request.

508: The base station sends an RRC connection reconfiguration message to the first UE.

509: The first UE sends an RRC connection reconfiguration complete message to the base station.

510: The base station sends a bearer setup response message to the core network entity.

511: The core network entity sends an update bearer response message to the second gateway by using the first gateway.

The update bearer response message includes the first EBI.

512: The core network entity sends a session management request to the second UE by using the first UE.

The session management request includes the second EBI and modified QoS of the bearer corresponding to the second EBI.

513: The core network entity modifies a target bearer on the first UE according to modified QoS.

It should be noted that this embodiment of the present invention is an embodiment of an application scenario specific to modifying the QoS of the bearer corresponding to the second EBI. If the second UE requests to modify a TFT rather than modifying the QoS of the bearer corresponding to the second EBI, step 505 to step 511 do not need to be performed. Specifically, it may be determined according to actual application, and this is not specifically limited herein.

Figure 6:
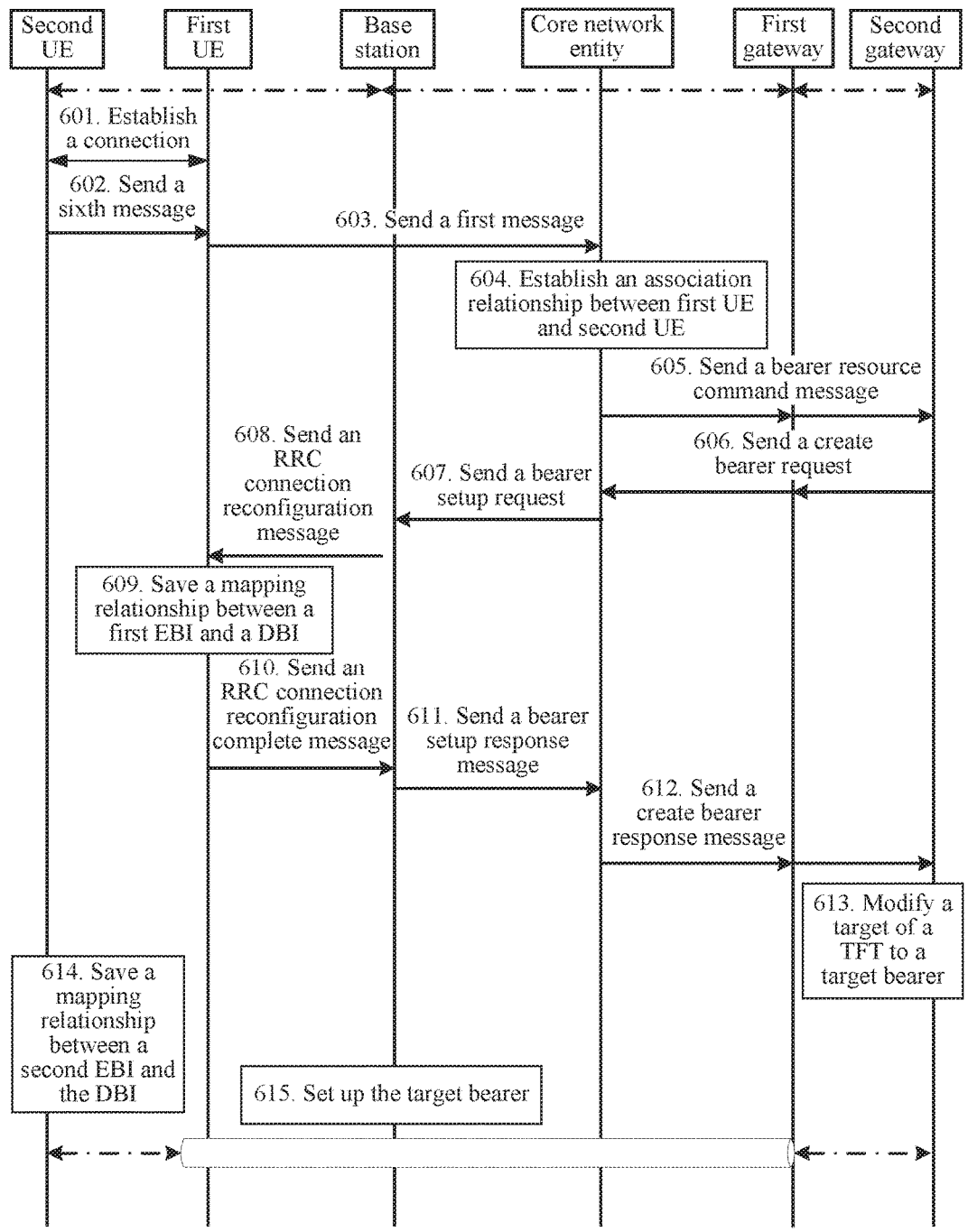
FIG. 6 is another schematic flowchart of a data transmission method according to an embodiment of the present invention.

Based on the foregoing embodiment, referring to FIG. 6, in this embodiment, an example in which the target bearer is used for data transmission between the first UE and the second gateway is used. A process of accessing, by the second UE after independently attaching to the core network entity, a network by using the first UE is specifically as follows.

601: First UE establishes a connection to second UE.

602: The second UE generates a sixth message, and may send the sixth message to the first UE by using a PC5 interface.

603: The first UE obtains a NAS message of the second UE from the sixth message, and encapsulates the NAS message in a first message; and the first UE sends the first message to a core network entity.

Step 601 to step 603 are the same as or similar to step 301 to step 303 in the embodiment shown in FIG. 3. Specifically, refer to step 301 to step 303 in the embodiment. Details are not described herein again.

604: The core network entity establishes an association relationship between the first UE and the second UE.

The core network entity determines, according to bearer context of the second UE, a bearer corresponding to each second EBI of the second UE, and determines whether a bearer satisfying QoS of a target bearer exists. If the bearer satisfying the QoS of the target bearer does not exist, the core network entity sets up a bearer corresponding to the QoS of the target bearer on the first UE. If the bearer satisfying the QoS of the target bearer exists, the core network entity instructs a second gateway to modify a target of a TFT to the target bearer on the first UE. When the bearer satisfying the QoS of the target bearer does not exist, the following steps are performed.

605: The core network entity sends a bearer resource command message to a second gateway by using a first gateway.

The bearer resource command message includes an LBI, where a value of the LBI is 0.

606: The second gateway sends a create bearer request to the core network entity by using the first gateway.

The create bearer request includes a TFT, where a value of the TFT is null.

It should be noted that in this embodiment of the present invention, a description is provided by using that the first UE and the second UE has a same first gateway and a same second gateway. When a first gateway and a second gateway of the first UE are different from a first gateway and a second gateway of the second UE, the core network entity controls the second gateway of the first UE and the second gateway of the second UE to set up a new tunnel, and instructs the second gateway of the second UE to map, to the newly set up tunnel, a target mapped to a TFT of the second UE. The core network entity further instructs the second gateway of the first UE to send, to a first EBI, data received on the newly set up tunnel.

607: The core network entity sends a bearer setup request to a base station.

The bearer setup request includes the first EBI, the QoS of the target bearer, and a session management request. The session management request includes the TFT, the QoS of the target bearer, an identity of the second UE, and a DBI. The value of the TFT is null, and the value of the LBI is 0.

608: The base station sends an RRC connection reconfiguration message to the first UE.

609: The first UE saves a mapping relationship between a first EBI and a DBI.

The first UE learns, according to the identity of the second UE in the session management request, that the target bearer is set up for the second UE, and the first UE saves the mapping relationship between the first EBI and the DBI.

610: The first UE sends an RRC connection reconfiguration complete message to the base station.

611: The base station sends a bearer setup response message to the core network entity.

612: The core network entity sends a create bearer response message to the second gateway by using the first gateway.

The create bearer response message includes the second EBI and the identity of the second UE.

613: The second gateway modifies a target of a TFT of the second UE to a target bearer.

614: The second UE saves a mapping relationship between a second EBI and the DBI.

615: The core network entity sets up the target bearer.

Step 614 and step 615 are the same as or similar to step 315 and step 316 in the embodiment shown in FIG. 3. Specifically, refer to step 315 and step 316 in the embodiment shown in FIG. 3, and details are not described herein again.

Figure 7:
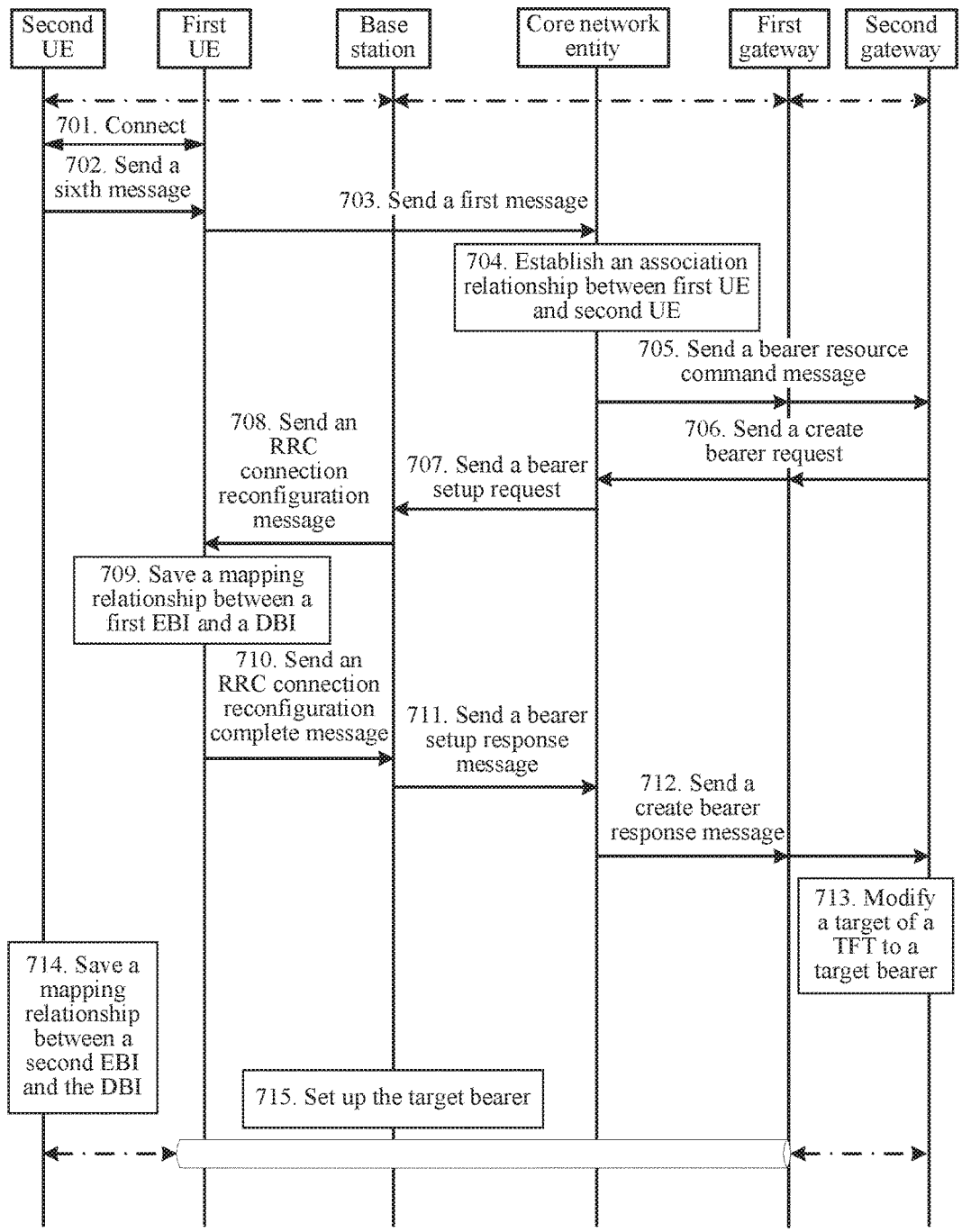
FIG. 7 is another schematic flowchart of a data transmission method according to an embodiment of the present invention.

Based on the embodiment shown in FIG. 6, referring to FIG. 7, in this embodiment, an example in which the target bearer is used for data transmission between the first UE and the second gateway is used. A process of accessing, by the second UE after detaching from the core network entity, a network by using the first UE is specifically as follows.

701: First UE and second UE are in a connected state.

702: The second UE sends a sixth message to the first UE.

The second UE generates the sixth message, and may send the sixth message to the first UE by using a PC5 interface. The sixth message includes a NAS attach (attach) message and an identity of the second UE.

703: The first UE sends a first message to a core network entity.

The core network entity may be an MME serving the first UE.

The first UE obtains a NAS message of the second UE from the sixth message, and encapsulates the NAS message in the first message.

When the first UE is in an idle state, the first UE may enter the connected state by sending a service request message to the MME serving the first UE, and send the first message to the core network entity. When the first UE is in the connected state, the first UE directly sends the first message to the core network entity.

It should be noted that the identity of the second UE may be a field that is independent of the TAS attach message, or may be carried in the TAS attach message. This is not specifically limited herein.

In some optional implementations, after the second UE sends the identity (for example, a GUTI) of the second UE to the first UE, the first UE sends, to the core network entity, an attach message carrying the GUTI.

For the NAS message, refer to the description in step 303, and details are not described herein again.

704: The core network entity establishes an association relationship between the first UE and the second UE.

The core network entity allocates a same first gateway and a same second gateway to the first UE and the second UE, and allocates a first EBI, a second EBI, and a DBI.

Further, the core network entity sends a create session request message to the second gateway by using the first gateway. The second gateway sends a create session response message to the core network entity by using the first gateway.

The core network entity determines, according to bearer context of the second UE, a bearer corresponding to each second EBI of the second UE, and determines whether a bearer satisfying QoS of a target bearer exists. If the bearer satisfying the QoS of the target bearer does not exist, the core network entity sets up a bearer corresponding to the QoS of the target bearer on the first UE. If the bearer satisfying the QoS of the target bearer exists, the core network entity instructs the second gateway to modify a target of a TFT to a bearer of the first UE. When the bearer satisfying the QoS of the target bearer does not exist, the following steps are performed.

705: The core network entity sends a bearer resource command message to a second gateway by using a first gateway.

706: The second gateway sends a create bearer request to the core network entity by using the first gateway.

707: The core network entity sends a bearer setup request to a base station.

708: The base station sends an RRC connection reconfiguration message to the first UE.

709: The first UE saves a mapping relationship between a first EBI and a DBI.

710: The first UE sends an RRC connection reconfiguration complete message to the base station.

711: The base station sends a bearer setup response message to the core network entity.

712: The core network entity sends a create bearer response message to the second gateway by using the first gateway.

713: The second gateway modifies a target of a TFT of the second UE to a target bearer.

714: The second UE saves a mapping relationship between a second EBI and the DBI.

715: The core network entity sets up the target bearer.

Step 705 to step 715 are the same as or similar to step 605 to step 615 in the embodiment shown in FIG. 6. Specifically, refer to step 605 to step 615 in the embodiment shown in FIG. 6, and details are not described herein again.

Figure 8:
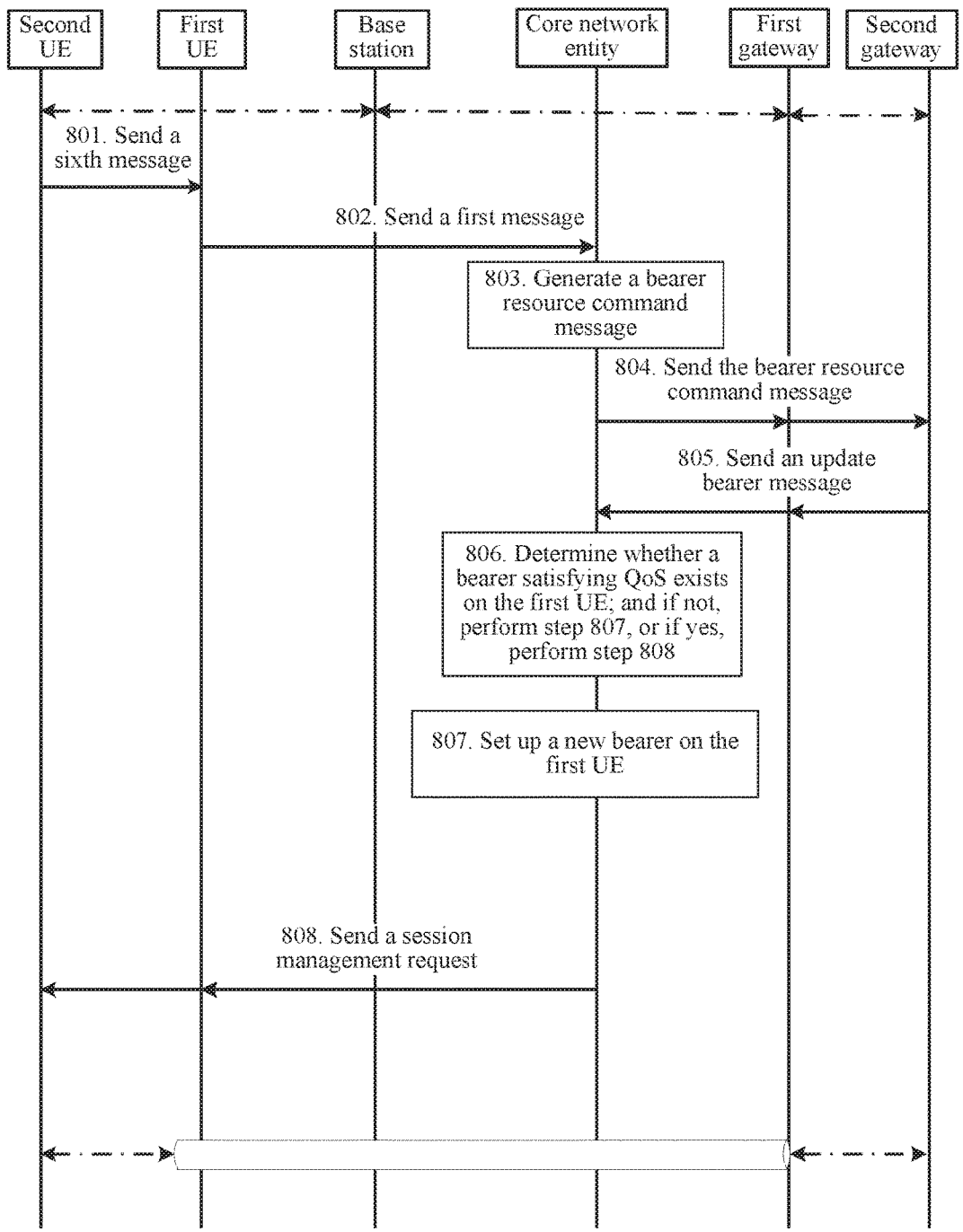
FIG. 8 is another schematic flowchart of a data transmission method according to an embodiment of the present invention.

Based on the embodiments shown in FIG. 6 and FIG. 7, referring to FIG. 8, in this embodiment, an example in which the target bearer is used for data transmission between the first UE and the second gateway is used. A process of initiating, by the second UE, bearer modification is specifically as follows.

801: Second UE generates a sixth message, and may send the sixth message to first UE by using a PC5 interface.

802: The first UE obtains a NAS message of the second UE from the sixth message, and encapsulates the NAS message in a first message; and the first UE sends the first message to a core network entity.

803: The core network entity generates a bearer resource command message.

804: The core network entity sends the bearer resource command message to a second gateway by using a first gateway.

805: The second gateway sends an update bearer request message to the core network entity by using the first gateway.

806: The core network entity determines whether a bearer satisfying QoS of a bearer of a second EBI exists on the first UE; and if not, performs step 807, or if yes, performs step 808.

807: The core network entity sets up a new bearer on the first UE.

Specifically, refer to step 605 to step 613 in the embodiment shown in FIG. 6, and details are not described herein again.

808: The core network entity sends a session management request to the second UE by using the first UE.

Specifically, refer to step 513 in the embodiment shown in FIG. 5, and details are not described herein again.

For better implementing the foregoing related method in the embodiments of the present invention, the following further provides a related apparatus configured to coordinate with the foregoing method.

Figure 9:
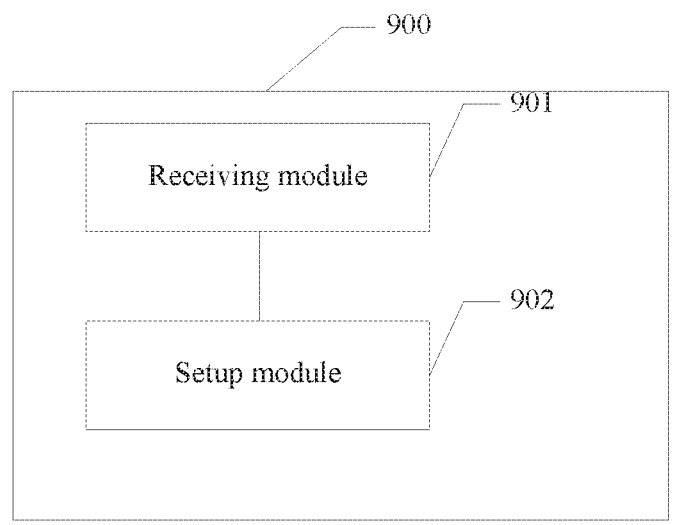
FIG. 9 is a schematic structural diagram of a core network entity according to an embodiment of the present invention.

Referring to FIG. 9, an embodiment of a core network entity 900 in an embodiment of the present invention includes: a receiving module 901 and a setup module 902.

The receiving module 901 is configured to receive a first message sent by first user equipment UE.

The setup module 902 is configured to set up a target bearer on the first UE according to the first message, so that second UE transmits data by using the target bearer.

Optionally, the setup module 902 includes: an obtaining unit, configured to obtain first bearer context, where the first bearer context is bearer context corresponding to a second evolved packet system bearer identity EBI of the second UE; and a setup unit, configured to set up the target bearer on the first UE according to the first bearer context.

Optionally, the setup module 902 includes: an obtaining unit, configured to obtain first bearer context, where the first bearer context is bearer context corresponding to a second EBI of the second UE, where the obtaining unit is further configured to obtain first quality of service QoS from the first bearer context; a sending unit, configured to: when it is determined that no bearer satisfying the first QoS exists on the first UE, send a second message to a second gateway by using a first gateway, so that the second gateway sends a third message to the core network entity by using the first gateway; and a setup unit, configured to set up, according to the third message, the target bearer satisfying the first QoS on the first UE.

Optionally, the second message includes a linked evolved packet system bearer identity LBI, where a value of the LBI is 0; and the third message includes a traffic flow template TFT, where a value of the TFT is null.

Optionally, the obtaining unit is specifically configured to: obtain, by using an identity of the second UE, context of the second UE from locally saved second bearer context of the second UE, and obtain the first bearer context from the context of the second UE, where the first message includes the identity of the second UE; or the obtaining unit is specifically configured to: obtain, by using an identity of the second UE, another core network entity currently saving the second UE other than the core network entity, obtain context of the second UE from the another core network entity, and obtain the first bearer context from the context of the second UE.

Optionally, the obtaining unit is specifically configured to: select, for the second UE, a first gateway and a second gateway that are the same as a first gateway and a second gateway of the first UE; send a fourth message to the second gateway by using the first gateway, so that the second gateway sends a fifth message to the core network entity by using the first gateway; and obtain the first bearer context from the fifth message.

Optionally, the core network entity 900 further includes: an allocation module, configured to allocate a first EBI, where the first EBI is an EBI corresponding to the target bearer; and a storage module, configured to save a mapping relationship between the first EBI and the second EBI.

Optionally, the allocation module is further configured to allocate a device to device bearer identity DBI.

Optionally, the core network entity 900 further includes: a sending module, configured to send the first EBI and the DBI to the first UE by using a base station serving the first UE, so that the first UE saves a mapping relationship between the first EBI and the DBI; or the sending module, configured to send an Internet Protocol IP address of the second UE, the first EBI, and the DBI to the first UE by using a base station serving the first UE, so that the first UE saves a mapping relationship between the IP address of the second UE and the first EBI, and the DBI.

Optionally, the core network entity 900 further includes: a sending module, configured to send the identity of the second UE to the first UE by using the base station serving the first UE, so that the first UE learns that the target bearer is set up for the second UE.

Optionally, the core network entity 900 further includes: a sending module, configured to send a TFT to the first UE by using the base station serving the first UE, where a value of the TFT is null; and/or a sending module, configured to send an LBI to the first UE by using the base station serving the first UE, where a value of the LBI is 0.

Optionally, the sending module is further configured to send the second EBI and the DBI to the second UE by using the first UE, so that the second UE saves a mapping relationship between the second EBI and the DBI.

Optionally, the setup module 902 is specifically configured to: send, to a base station serving the first UE, a tunnel endpoint identifier TEID that is of the first gateway and that corresponds to the second EBI, and the first EBI; and send, to the first gateway, a TEID that is of the base station and that corresponds to the first EBI, and the second EBI, so that the first gateway establishes a tunnel connection to the base station.

Optionally, the setup module 902 is specifically configured to send a sixth message to the second gateway by using the first gateway, so that the second gateway modifies a current mapping target of a TFT of the second UE from a bearer corresponding to the second EBI to the target bearer, where the current target of the TFT of the second UE is the bearer corresponding to the second EBI, and the target bearer has same QoS as the bearer corresponding to the second EBI.

Optionally, the sixth message includes an identity of the second UE and the second EBI.

Optionally, the first message includes a non-access stratum NAS message of the second UE; or the first message includes the NAS message of the second UE and the identity of the second UE.

Optionally, the NAS message is generated by the second UE, the second UE sends the NAS message to the first UE by using an interface between the second UE and the first UE, and the first UE sends the NAS message to the core network entity by using the first message.

Optionally, the core network entity 900 further includes: a receiving module 901, configured to receive a seventh message sent by the first UE, where the seventh message includes the NAS message of the second UE, where the NAS message of the second UE is used to request to modify the bearer corresponding to the second EBI of the second UE; a mapping module, configured to: when it is learnt that QoS of the bearer corresponding to the second EBI needs to be modified to second QoS, obtain through mapping the first EBI according to the mapping relationship between the second EBI and the first EBI; and a modification module, configured to modify a bearer corresponding to the first EBI on the first UE, so that the bearer corresponding to the first EBI satisfies the second QoS.

Optionally, the core network entity 900 further includes: a receiving module 901, configured to receive a seventh message sent by the first UE, where the seventh message includes the NAS message of the second UE, where the NAS message of the second UE is used to request to modify the bearer corresponding to the second EBI of the second UE; and the setup module 902 is further configured to: when it is learnt that QoS of the bearer corresponding to the second EBI needs to be modified to second QoS and the core network entity determines that there is no bearer satisfying the second QoS on the first UE currently, set up, by the core network entity, a bearer satisfying the second QoS on the first UE.

Optionally, the NAS message includes: a NAS TAU message; or a NAS attach message; or a NAS request bearer resource modification message.

Optionally, the target bearer is a bearer between the first UE and the first gateway; or the target bearer is a bearer between the first UE and the second gateway.

In this embodiment of the present invention, the receiving module receives a first message sent by first user equipment UE; and the setup module sets up a target bearer on the first UE according to the first message, so that second UE transmits data by using the target bearer. Different from the prior art, the second UE transmits the data by using the target bearer, that is, when the second UE changes between working modes of accessing a network by itself and accessing the network by using the first UE, the data is transmitted by using the target bearer, and an IP address remains unchanged; therefore, continuity of the IP address can be ensured, communication is not interrupted, and QoS of a related service of the second UE is also ensured.

Based on the embodiment shown in FIG. 9, user equipment is further described. An embodiment of the user equipment includes: a sending module, configured to send a first message to a core network entity, so that the core network entity sets up a target bearer on the first UE according to the first message, and second UE transmits data by using the target bearer.

Optionally, the user equipment further includes: an obtaining module, configured to obtain a first evolved packet system bearer identity EBI, where the first EBI is an EBI corresponding to the target bearer; an allocation module, configured to allocate a device to device bearer identity DBI;

and a storage module, configured to save a mapping relationship between the first EBI and the DBI; or the obtaining module, further configured to obtain an Internet Protocol IP address of the second UE, where the first UE saves a mapping relationship between the IP address of the second UE and the first EBI, and the DBI.

Optionally, the sending module is further configured to send the DBI and QoS of the target bearer to the second UE, so that the second UE learns that QoS of a bearer corresponding to a second EBI on the second UE is the same as the QoS of the target bearer, and saves a mapping relationship between the second EBI and the DBI.

Optionally, the receiving module is further configured to receive a first EBI corresponding to the target bearer and a DBI that are sent by the core network entity by using a base station serving the first UE; and the storage module is further configured to save a mapping relationship between the first EBI and the DBI; or the receiving module is further configured to receive an IP address of the second UE, the first EBI, and a DBI that are sent by the core network entity by using a base station serving the first UE; and the storage module is further configured to save a mapping relationship between the IP address of the second UE and the first EBI, and the DBI.

Optionally, the receiving module is further configured to receive an identity of the second UE sent by the core network entity by using the base station serving the first UE; and the first UE learns, according to the identity of the second UE, that the target bearer is set up by the core network entity for the second UE.

Optionally, the receiving module is further configured to receive a TFT that is sent by the core network entity by using the base station serving the first UE, where a value of the TFT is null; and/or the receiving module is further configured to receive an LBI that is sent by the core network entity by using the base station serving the first UE, where a value of the LBI is 0.

Optionally, the sending module includes: a receiving unit, configured to receive a sixth message sent by the second UE, where the sixth message includes a non-access stratum NAS message sent by the second UE to the core network entity; an obtaining unit, configured to obtain the NAS message; and a sending unit, configured to send the NAS message to the core network entity by using the first message.

Optionally, the obtaining unit is specifically configured to: learn, according to indication information, that the sixth message includes the NAS message, and obtain the NAS message from the sixth message, where the sixth message includes the indication information indicating that the sixth message includes the NAS message.

Optionally, the first message includes the NAS message of the second UE; or the first message includes the NAS message of the second UE and the identity of the second UE.

Optionally, the sending module is further configured to send a seventh message to the core network entity, where the seventh message includes the NAS message of the second UE, where the NAS message of the second UE is used to request to modify the bearer corresponding to the second EBI of the second UE.

Optionally, the first UE receives an eighth message sent by the core network entity, and learns that the eighth message includes the NAS message sent to the first UE; and the first UE obtains the NAS message, and sends the NAS message to the second UE.

Optionally, the first message includes indication information indicating that the first message includes another NAS message; and the eighth message includes indication information indicating that the eighth message includes another NAS message.

Optionally, the sending module is specifically configured to send a ninth message to the second UE, where the ninth message includes indication information indicating that the ninth message includes the NAS message.

Optionally, the receiving module is further configured to: receive data that is sent by the second UE by using a bearer corresponding to the DBI, where the first UE sends, according to the mapping relationship between the DBI and the first EBI, the data to a network by using the target bearer corresponding to the first EBI; or the receiving module is further configured to: receive data that is sent by the second UE by using a bearer corresponding to the DBI, where the first UE sends, according to the mapping relationship between the IP address of the second UE and the first EBI, and the DBI, the data to a network by using the target bearer corresponding to the first EBI.

Optionally, the receiving module is further configured to: receive data that is sent by the network by using the target bearer corresponding to the first EBI, where the first UE sends, according to the mapping relationship between the first EBI and the DBI, the data to the second UE by using the bearer corresponding to the DBI; or the receiving module is further configured to: receive data that is sent by the network by using the target bearer corresponding to the first EBI, where the first UE sends, according to a mapping relationship between the first EBI and a destination IP address of the data, and the DBI, the data to the second UE by using the bearer corresponding to the DBI.

Optionally, the NAS message includes: a NAS TAU message; or a NAS attach message; or a NAS request bearer resource modification message.

In this embodiment of the present invention, the sending module sends a first message to a core network entity, so that the core network entity sets up a target bearer on the first UE according to the first message, and second UE transmits data by using the target bearer. Different from the prior art, the second UE transmits the data by using the target bearer, that is, when the second UE changes between working modes of accessing a network by itself and accessing the network by using the first UE, the data is transmitted by using the target bearer, and an IP address remains unchanged; therefore, continuity of the IP address can be ensured, communication is not interrupted, and QoS of a related service of the second UE is also ensured.

Another user equipment is further described below. An embodiment of the another user equipment 1000 includes: a sending module 1001 and a data transmission module 1002.

The sending module 1001 is configured to send a first message to a core network entity by using first UE, so that the core network entity sets up a target bearer on the first UE according to the first message.

The data transmission module 1002 is configured to transmit data by using the target bearer.

Optionally, the sending module 1001 includes: a generation unit, configured to generate a NAS message sent to the core network entity; and a sending unit, configured to send a sixth message to the first UE, so that the first UE obtains the NAS message from the sixth message, and sends the NAS message to the core network entity by using the first message.

Optionally, the sending unit is specifically configured to: learn, according to indication information, that the sixth message includes the NAS message, and obtain the NAS message from the sixth message, where the sixth message includes the indication information indicating that the sixth message includes the NAS message.

Optionally, the user equipment further includes: a receiving module, configured to: after the sending module sends the first message to the core network entity by using the first UE, receive an eighth message sent by the first UE, where the eighth message includes indication information indicating that the eighth message includes the NAS message; and an obtaining module, configured to: learn, according to the indication information, that the eighth message includes the NAS message, and obtain the NAS message.

Optionally, the user equipment further includes: a receiving module, configured to: after the sending module sends the first message to the core network entity by using the first UE, receive a second EBI and a DBI that are sent by the first UE; and a storage module, configured to save a mapping relationship between the second EBI and the DBI.

Optionally, the user equipment further includes: a receiving module, configured to: receive a ninth message sent by the first UE, where the ninth message includes a DBI and QoS, the second UE learns that QoS of a bearer corresponding to the second EBI is the same as the QoS included in the ninth message, and the second UE saves a mapping relationship between the second EBI and the DBI.

Optionally, the data transmission module 1002 is specifically configured to: when it is determined according to a TFT that the data needs to be sent by using the bearer corresponding to the second EBI, send the data to the first UE by using a bearer corresponding to the DBI.

In this embodiment of the present invention, the sending module sends a first message to a core network entity by using first UE, so that the core network entity sets up a target bearer on the first UE according to the first message; and the data transmission module transmits data by using the target bearer. Different from the prior art, the second UE transmits the data by using the target bearer, that is, when the second UE changes between working modes of accessing a network by itself and accessing the network by using the first UE, the data is transmitted by using the target bearer, and an IP address remains unchanged; therefore, continuity of the IP address can be ensured, communication is not interrupted, and QoS of a related service of the second UE is ensured.

The present invention further provides a communications system 1100, including: a core network entity 1101, first UE 1102, and second UE 1103. For the core network entity 1101, the first UE 1102, and the second UE 1103, specifically, refer to the core network entity, the first UE, and the second UE in the foregoing embodiments, and details are not described herein again.

Figure 10:
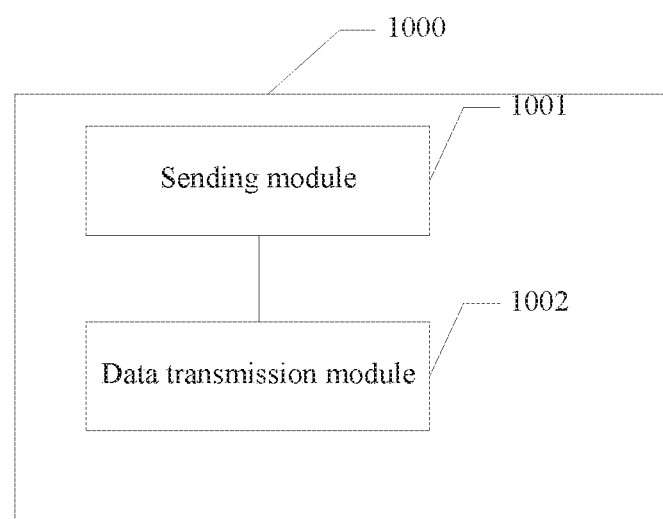
FIG. 10 is a schematic structural diagram of user equipment according to an embodiment of the present invention.
Figure 11:
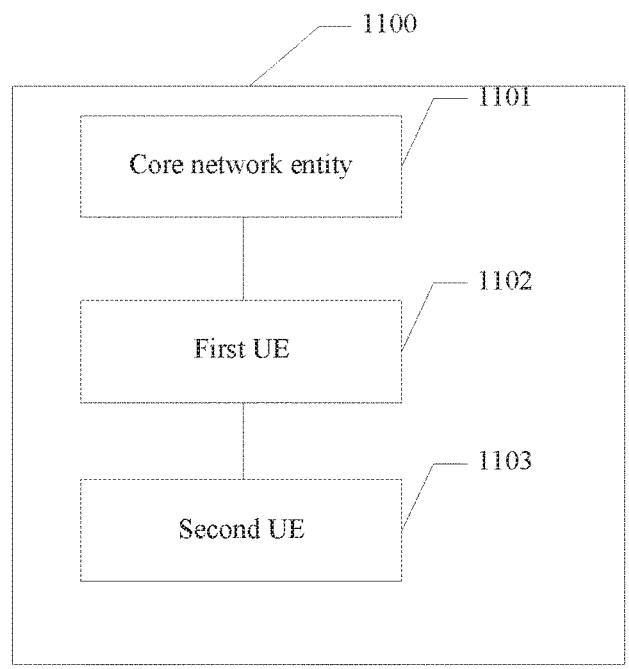
FIG. 11 is a schematic structural diagram of a communications system according to an embodiment of the present invention.

The embodiments shown in FIG. 9 and FIG. 10 describe a specific structure of a related device for data transmission from a perspective of function modules, and a specific structure of a data transmission apparatus is described below from a perspective of hardware with reference to an embodiment in FIG. 12.

Figure 12:
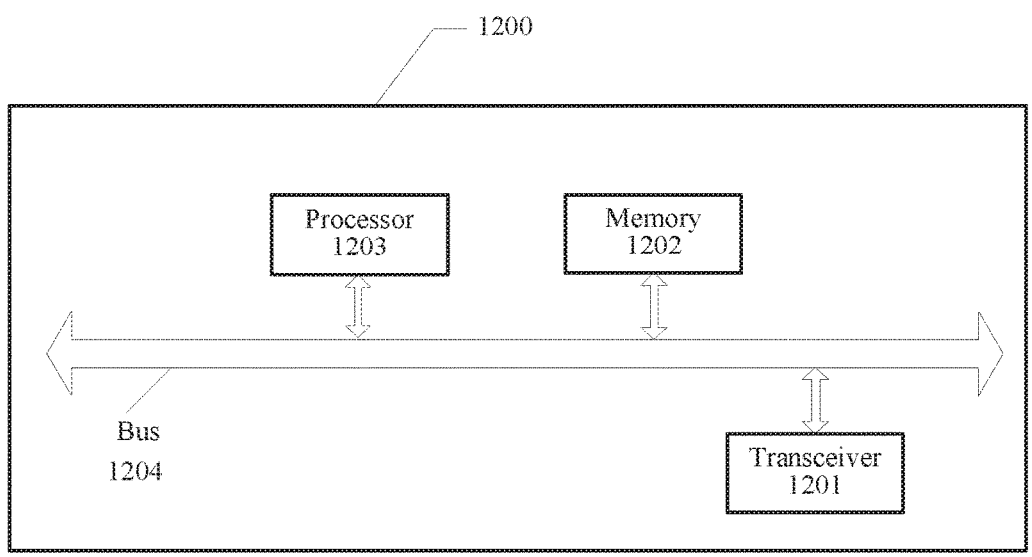
FIG. 12 is a schematic structural diagram of a data transmission apparatus according to an embodiment of the present invention.

Referring to FIG. 12, FIG. 12 is a schematic structural diagram of a data transmission apparatus 1200 according to an embodiment of the present invention. The data transmission apparatus 1200 includes: a transceiver 1201, a memory 1202, a processor 1203, and a bus 1204. The transceiver 1201, the memory 1202, and the processor 1203 are connected to the bus 1204.

The transceiver 1201 is configured to receive or send data.

The memory 1202 is configured to save a program, and the processor 1203 is configured to invoke the program to perform the following operations: obtaining a first message; and setting up a target bearer on first UE according to the first message, so that second UE transmits data by using the target bearer.

In some optional embodiments, the processor 1203 is further configured to perform the following operations: obtaining first bearer context, where the first bearer context is bearer context corresponding to a second evolved packet system bearer identity EBI of the second UE; and setting up the target bearer on the first UE according to the first bearer context.

In some optional embodiments, the processor 1203 is further configured to perform the following operations: obtaining first bearer context, where the first bearer context is bearer context corresponding to a second EBI of the second UE; obtaining first quality of service QoS from the first bearer context; when it is determined that no bearer satisfying the first QoS exists on the first UE, sending a second message to a second gateway by using a first gateway, so that the second gateway sends a third message to the core network entity by using the first gateway; and setting up, according to the third message, the target bearer satisfying the first QoS on the first UE.

In some optional embodiments, the processor 1203 is further configured to perform the following operations: the first message includes an identity of the second UE; and obtaining, by using the identity of the second UE, context of the second UE from locally saved second bearer context of the second UE, and obtaining the first bearer context from the context of the second UE; or obtaining, by using the identity of the second UE, another core network entity currently saving the second UE other than the core network entity, obtaining context of the second UE from the another core network entity, and obtaining the first bearer context from the context of the second UE.

In some optional embodiments, the processor 1203 is further configured to perform the following operations: selecting, for the second UE, a first gateway and a second gateway that are the same as a first gateway and a second gateway of the first UE; sending a fourth message to the second gateway by using the first gateway, so that the second gateway sends a fifth message to the core network entity by using the first gateway; and obtaining the first bearer context from the fifth message.

In some optional embodiments, the processor 1203 is further configured to perform the following operations: allocating a first EBI, where the first EBI is an EBI corresponding to the target bearer; and saving a mapping relationship between the first EBI and the second EBI.

In some optional embodiments, the processor 1203 is further configured to perform the following operation: allocating a device to device bearer identity DBI.

In some optional embodiments, the processor 1203 is further configured to perform the following operations: receiving a seventh message sent by the first UE, where the seventh message includes a NAS message of the second UE, where the NAS message of the second UE is used to request to modify the bearer corresponding to the second EBI of the second UE; and when it is learnt that QoS of the bearer corresponding to the second EBI needs to be modified to second QoS and the core network entity determines that there is no bearer satisfying the second QoS on the first UE currently, setting up a bearer satisfying the second QoS on the first UE.

It can be seen from the foregoing that a core network entity receives a first message sent by first user equipment UE; and the core network entity sets up a target bearer on the first UE according to the first message, so that second UE transmits data by using the target bearer. Different from the prior art, the second UE transmits the data by using the target bearer, that is, when the second UE changes between working modes of accessing a network by itself and accessing the network by using the first UE, the data is transmitted by using the target bearer, and an IP address remains unchanged; therefore, continuity of the IP address can be ensured, communication is not interrupted, and QoS of a related service of the second UE is also ensured.

In the foregoing embodiments, the description of each embodiment has respective focuses. For a part that is not described in detail in an embodiment, refer to related descriptions in other embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be saved in a computer-readable storage medium. Based on such an understanding, the technical solutions of the present invention essentially, or the part contributing to the prior art, or all or some of the technical solutions may be implemented in the form of a software product. The computer software product is saved in a storage medium and includes several instructions for instructing a computer device (which may be a personal computer, a server, or a network device) to perform all or some of the steps of the methods described in the embodiments of the present invention. The foregoing storage medium includes: any medium that can save program code, such as a USB flash drive, a removable hard disk, a read-only memory (ROM), a random access memory (RAM), a magnetic disk, or an optical disc.

The data transmission method and the related device provided in the present invention are described in detail above. The principle and implementations of the present invention are described herein by using specific examples.

The descriptions about the embodiments are merely provided to help understand the method and core ideas of the present invention. In addition, a person of ordinary skill in the art can make variations and modifications to the present invention in terms of the specific implementations and application scopes according to the ideas of the present invention. Therefore, the content of the specification shall not be construed as a limit to the present invention.

What is claimed is:

1. A method, comprising:
    sending, by a first user equipment UE, a first message to a core network entity in a network, wherein the core network entity sets up a target bearer for the first UE according to the first message, the target bearer providing access to transmit data external to the network, and a second UE transmits data using the target bearer for the first UE;
    obtaining, by the first UE, a first evolved packet system bearer identity (EBI), wherein the first EBI corresponds to the target bearer;
    allocating, by the first UE, a device to device bearer identity (DBI), wherein the DBI is used to identify a bearer used to transmit data between the first UE and the second UE;
    saving, by the first UE, a mapping relationship between the first EBI and the DBI; and
    sending, by the first UE, the DBI and a quality of service (QoS) of the target bearer to the second UE, so that the second UE learns that a QoS of a bearer corresponding to a second EBI on the second UE is the same as the QoS of the target bearer, and saves a mapping relationship between the second EBI and the DBI.

2. The method according to claim 1, wherein after sending, by the first user equipment UE, the first message to a core network entity, the method further comprises:
    obtaining, by the first UE, an Internet Protocol (IP) address of the second UE, wherein saving the mapping relationship includes saving the mapping relationship between the IP address of the second UE, the first EBI, and the DBI.

3. The method according to claim 1, wherein after the sending, by the first UE, the first message to the core network entity, the method further comprises:
    receiving, by the first UE, a first evolved packet system bearer identity (EBI) corresponding to the target bearer and a device to device bearer identity (DBI) that are sent by the core network entity using a base station serving the first UE, and saving, by the first UE, a mapping relationship between the first EBI and the DBI; or
    receiving, by the first UE, an IP address of the second UE, the first EBI, and a DBI that are sent by the core network entity using a base station serving the first UE, and saving, by the first UE, a mapping relationship between the IP address of the second UE, the first EBI, and the DBI.

4. The method according to claim 1, wherein the method further comprises:
    receiving, by the first UE, an identity of the second UE that is sent by the core network entity using a base station serving the first UE; and
    learning, by the first UE according to the identity of the second UE, that the target bearer is set up by the core network entity for the second UE.

5. The method according to claim 1, wherein the method further comprises:

receiving, by the first UE, a traffic flow template (TFT) that is sent by the core network entity by using a base station serving the first UE, wherein a value of the TFT is null; or receiving, by the first UE, an Linked EPS Bearer ID, (LBI) that is sent by the core network entity using the base station serving the first UE, wherein a value of the LBI is 0.

6. The method according to claim 1, wherein sending, by the first UE, the first message to the core network entity comprises:

receiving, by the first UE, a sixth message sent by the second UE, wherein the sixth message comprises a non-access stratum (NAS) message sent by the second UE to the core network entity; and obtaining, by the first UE, the NAS message, and sending the NAS message to the core network entity using the first message.

7. The method according to claim 6, wherein the sixth message comprises indication information indicating that the sixth message comprises the NAS message; and wherein obtaining, by the first UE, the NAS message comprises:

learning, by the first UE according to the indication information, that the sixth message comprises the NAS message, and obtaining the NAS message from the sixth message.

8. The method according to claim 1, wherein:

the first message comprises a non-access stratum (NAS) message of the second UE; or the first message comprises the NAS message of the second UE and an identity of the second UE.

9. The method according to claim 8, wherein after sending, by the first UE, the first message to the core network entity, the method comprises:

sending, by the first UE, a seventh message to the core network entity, wherein the seventh message comprises the NAS message of the second UE;

wherein the NAS message of the second UE requests to modify a bearer corresponding to a second first evolved packet system bearer identity (EBI) of the second UE.

10. The method according to claim 9, wherein the NAS message comprises:

a NAS TAU message;

a NAS attach message; or a NAS request bearer resource modification message.

11. The method according to claim 1, wherein after sending, by the first UE, the first message to the core network entity, the method comprises:

receiving, by the first UE, an eighth message sent by the core network entity;

learning that the eighth message comprises a non-access stratum (NAS) message sent to the first UE; and obtaining, by the first UE, the NAS message, and sending the NAS message to the second UE.

12. The method according to claim 11, wherein the first message comprises indication information indicating that the first message comprises another NAS message; and wherein the eighth message comprises indication information indicating that the eighth message comprises another NAS message.

13. The method according to claim 11, wherein sending the NAS message to the second UE comprises:

sending, by the first UE, a ninth message to the second UE, wherein the ninth message comprises indication information indicating that the ninth message comprises the NAS message.

14. The method according to claim 1, further comprising:

receiving, by the first UE, data that is sent by the second UE using a bearer corresponding to a device to device bearer identity (DBI), and sending, by the first UE according to a mapping relationship between the DBI and a first a first evolved packet system bearer identity (EBI) corresponding to the target bearer, the data to a network using the target bearer corresponding to the first EBI; or receiving, by the first UE, data that is sent by the second UE using a bearer corresponding to the DBI, and sending, by the first UE according to the mapping relationship between an IP address of the second UE, the first EBI, and the DBI, the data to a network using the target bearer corresponding to the first EBI.

15. The method according to claim 14, further comprising:

receiving, by the first UE, data that is sent by the network using the target bearer corresponding to the first EBI, and sending, by the first UE according to the mapping relationship between the first EBI and the DBI, the data to the second UE using the bearer corresponding to the DBI; or receiving, by the first UE, data that is sent by the network using the target bearer corresponding to the first EBI, and sending, by the first UE according to a mapping relationship between the first EBI and a destination IP address of the data, and the DBI, the data to the second UE using the bearer corresponding to the DBI.

16. A non-transitory computer-readable storage medium comprising instructions which, when executed by a computer, cause the computer to carry out the method of claim 1.

17. A mobile terminal, comprising:

a non-transitory memory configured to store a program;

a channel interface coupled to the memory; and a processor coupled to the memory and the channel interface, wherein the program causes the processor to be configured to:

send a first message to a core network entity, so that the core network entity sets up a target bearer for the mobile terminal according to the first message, the target bearer providing access to a network gateway, and a second user equipment (UE) transmits data using the target bearer for the mobile terminal;

obtain a first evolved packet system bearer identity (EBI), wherein the first EBI is used to identify a bearer used to transmit data between the mobile terminal and the second UE;

allocate a device to device bearer identity (DBI), wherein the DBI corresponds to a bearer of the second UE;

save a mapping relationship between the first EBI and the DBI; and send the DBI and a quality of service (QoS) of the target bearer to the second UE, so that the second UE learns that a QoS of a bearer corresponding to a second EBI on the second UE is the same as the QoS of the target bearer, and saves a mapping relationship between the second EBI and the DBI.

18. The mobile terminal according to claim 17, wherein after sending the first message to the core network entity, the program further causes the processor to be configured to:

obtain an Internet Protocol (IP) address of the second UE, wherein saving the mapping relationship further includes saving the mapping relationship between the IP address of the second UE, the first EBI, and the device to device bearer identity (DBI).

19. The mobile terminal according to claim 17, wherein the program further causes the processor to be configured to:
   receive an identity of the second UE that is sent by the core network entity using a base station serving the mobile terminal; and
   learn, according to the identity of the second UE, that the target bearer is set up by the core network entity for the second UE.

20. The mobile terminal according to claim 17, wherein the program further causes the processor to be configured to:
   receive a traffic flow template (TFT) that is sent by the core network entity by using a base station serving the mobile terminal, wherein a value of the TFT is null; or
   receive a Linked EPS Bearer ID (LBI) that is sent by the core network entity using the base station serving the mobile terminal, wherein a value of the LBI is 0.

* * * * *